United States Patent
Sharma et al.

(10) Patent No.: US 11,341,690 B2
(45) Date of Patent: May 24, 2022

(54) PROVIDING COLOR MANIPULATION TOOLS DYNAMICALLY CUSTOMIZED BASED ON IMAGE CONTENT

(71) Applicant: Adobe Inc., San Jose, CA (US)

(72) Inventors: Mrinal Kumar Sharma, Hazaribagh (IN); Shailendra Singh Rathore, Jodhpur (IN); Gourav Singhal, Delhi (IN)

(73) Assignee: Adobe Inc., San Jose, CA (US)

( * ) Notice: Subject to any disclaimer, the term of this patent is extended or adjusted under 35 U.S.C. 154(b) by 266 days.

(21) Appl. No.: 16/670,420

(22) Filed: Oct. 31, 2019

(65) Prior Publication Data

US 2021/0134023 A1    May 6, 2021

(51) Int. Cl.
| | |
|---|---|
| *G06F 3/0482* | (2013.01) |
| *G06T 11/00* | (2006.01) |
| *G06T 11/60* | (2006.01) |
| *G06F 3/04845* | (2022.01) |
| *G06T 3/40* | (2006.01) |

(52) U.S. Cl.
CPC .......... *G06T 11/001* (2013.01); *G06F 3/0482* (2013.01); *G06F 3/04845* (2013.01); *G06T 3/4015* (2013.01); *G06T 11/60* (2013.01)

(58) Field of Classification Search
CPC ..... G06T 11/001; G06T 11/60; G06T 3/4015; G06F 3/0482; G06F 3/04845
See application file for complete search history.

(56) References Cited

U.S. PATENT DOCUMENTS

| | | | |
|---|---|---|---|
| 2005/0157926 A1* | 7/2005 | Moravec | G06T 11/001 382/173 |
| 2009/0097746 A1* | 4/2009 | Shinjo | G06K 9/2018 382/168 |
| 2013/0050238 A1* | 2/2013 | Bergou | G06K 9/6218 345/589 |
| 2017/0103502 A1* | 4/2017 | Gilra | G06T 5/001 |

OTHER PUBLICATIONS

AdobePress; The HSL / Color / B&W Panel in Adobe Photoshop Lightroom 4; by Martin Evening; dated Aug. 18, 2012; https://www.adobepress.com/articles/article.asp?p=1930490.

* cited by examiner

*Primary Examiner* — Anil K Bhargava
(74) *Attorney, Agent, or Firm* — Keller Preece PLLC

(57) ABSTRACT

The present disclosure relates to systems, non-transitory computer-readable media, and methods that generate customized color editing options tailored to a digital image. In particular, in one or more embodiments, the disclosed systems generate an interactive editing user interface that includes selectable color controls corresponding to dominant colors extracted from the digital image and ordered by dominance. In at least one embodiment, the disclosed systems utilizes clustering techniques associated with the dominant representative colors to generate contour paths in the digital image further enabling dynamic interactive image editing.

20 Claims, 14 Drawing Sheets

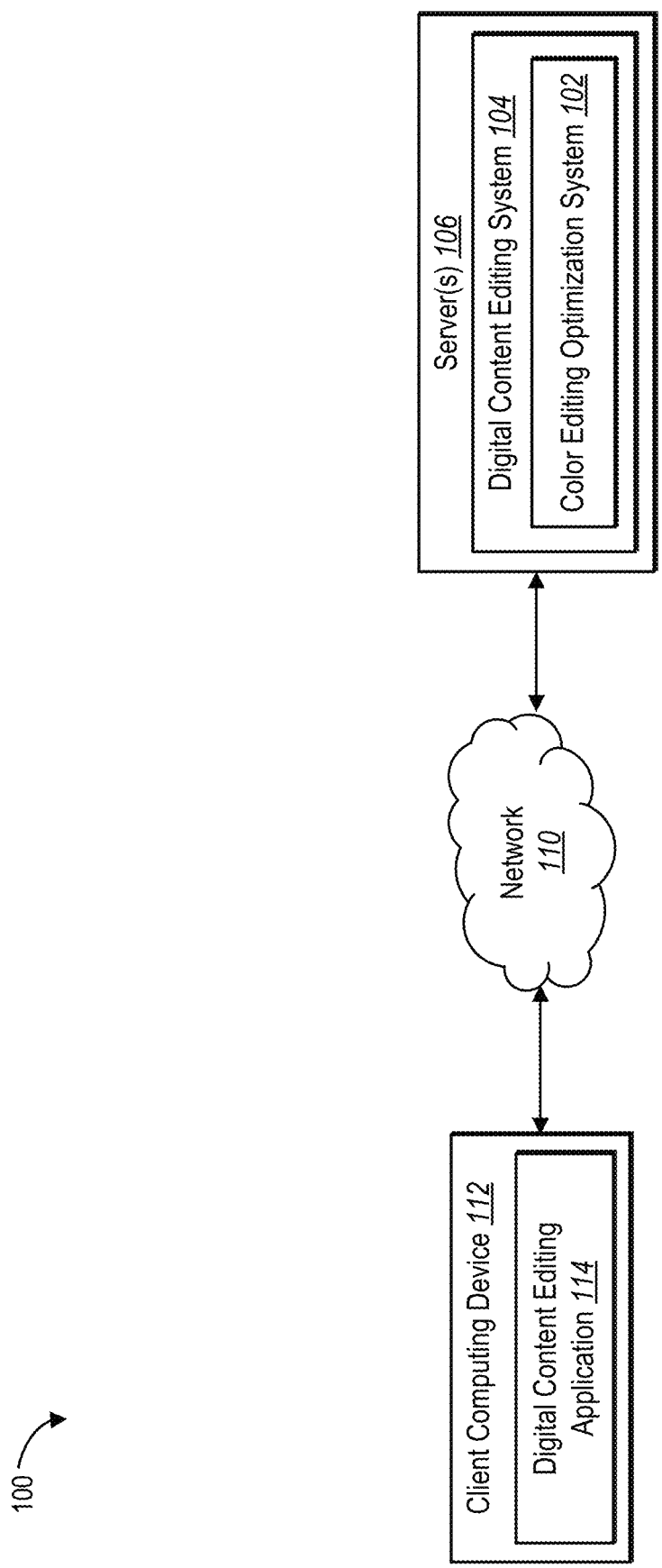

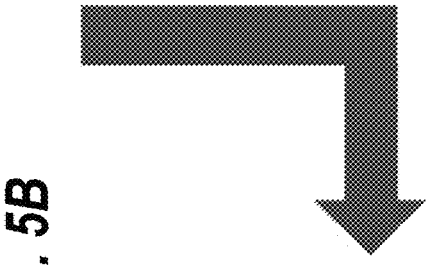
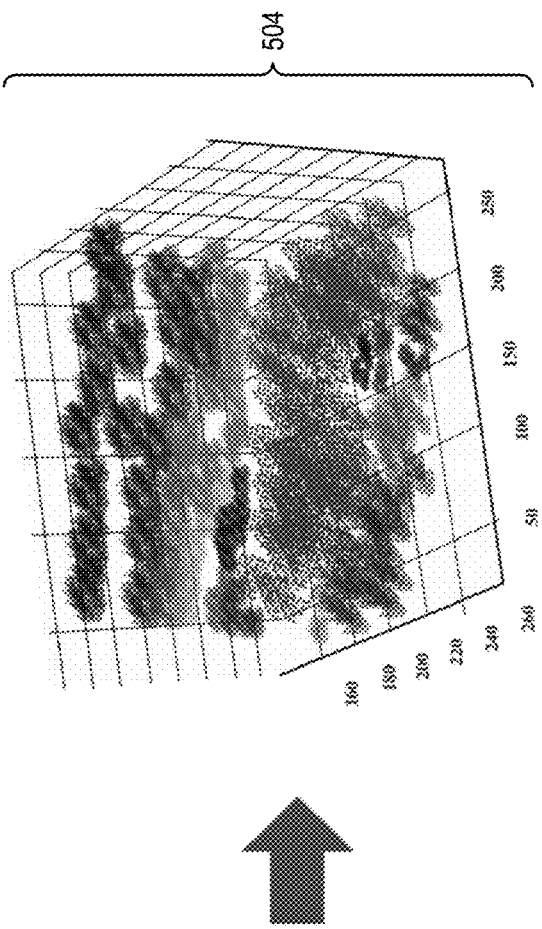
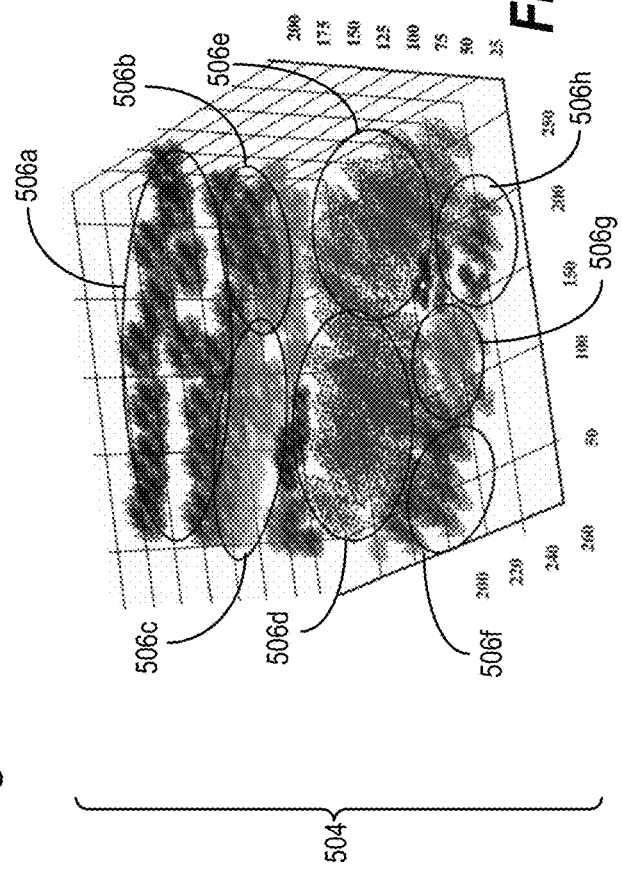
Fig. 5A   Fig. 5B   Fig. 5C

PROVIDING COLOR MANIPULATION TOOLS DYNAMICALLY CUSTOMIZED BASED ON IMAGE CONTENT

BACKGROUND

Recent years have seen significant improvements in hardware and software platforms for editing digital images. For example, conventional systems now enable a user to interact with various controls in order to alter image characteristics such as hue, saturation, and luminance.

SUMMARY

One or more embodiments provide benefits and/or solve one or more of the foregoing or other problems in the art with systems, methods, and non-transitory computer readable storage media that dynamically analyze digital images and intelligently generate customized editing tools based on the content of the digital images. For example, the disclosed systems can analyze a digital image to determine the dominant colors in the digital image. The disclosed systems can then generate a plurality of selectable color controls corresponding to the dominant colors in the digital image. In response to a selection of a selectable color control, the disclosed systems can highlight portions of the digital image having a color associated with the selectable color control and provide various controls that enable alteration of characteristics of that color within the digital image. In this manner, the disclosed systems can accurately and efficiently provide color editing options within a customized editing user interface that are relevant and intuitive based on the digital image currently being edited.

Additional features and advantages of one or more embodiments of the present disclosure will be set forth in the description that follows, and in part will be obvious from the description, or may be learned by practice of such example embodiments.

BRIEF DESCRIPTION OF THE DRAWINGS

The detailed description is described with reference to the accompanying drawings in which:

FIG. 1 illustrates an example environment in which a color editing optimization system operates in accordance with one or more embodiments;

FIGS. 5A-5C illustrate an example of generating clusters of color data points associated with a digital image to be edited in accordance with one or more embodiments;

DETAILED DESCRIPTION

Figure 2B:
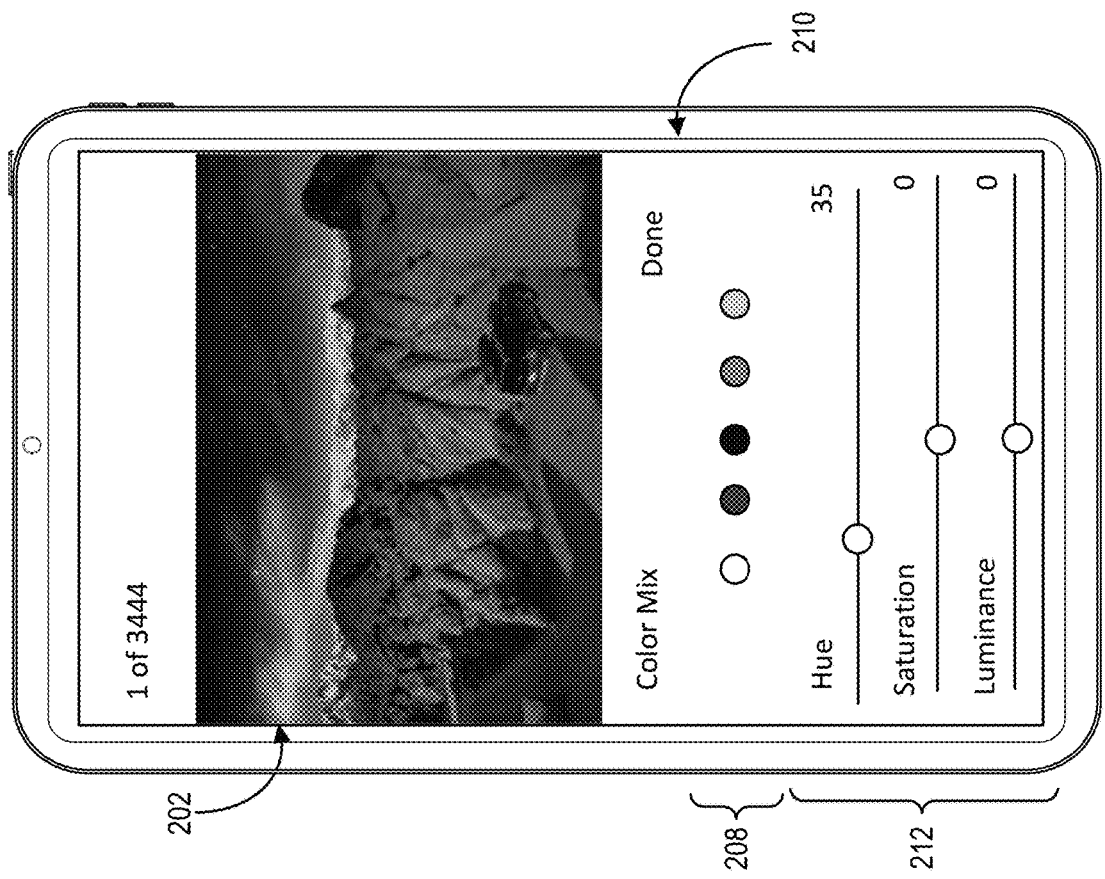
FIGS. 2A and 2B illustrate features of the color editing optimization system in contrast with deficiencies of the prior art in accordance with one or more embodiments.

One or more embodiments of the present disclosure includes a color editing optimization system that generates a customized editing user interface with selectable color controls for use in connection with editing a digital image. In particular, the color editing optimization system can generate customized editing user interfaces that are tailored to specific digital images such that each display includes selectable color controls that directly correlate to colors in a corresponding digital image. For example, the color editing optimization system can analyze a digital image to be edited to generate hue clusters of dominant colors from the digital image. The color editing optimization system can generate the customized editing user interface for the digital image based on the hue clusters. Furthermore, a selection of one of the plurality of selectable color controls enables editing of color characteristics (e.g., hue, saturation, luminance) of corresponding pixels in the digital image. In this manner, the color editing optimization system can efficiently and accurately provide customized color controls relative to a digital image to be edited enabling precise color corrections within the digital image.

To illustrate, conventional systems generally provide color-based image editing tools relative to a default set of color choices. Conventional systems provide the same number and order of default color choices regardless of the colors present in the digital image currently being edited. Because conventional systems provide these color choices with no correlation to the digital image, any color-based edits performed in connection with these color choices are imprecise.

To remedy these and other problems, the color editing optimization system can generate a customized editing user interface that is specifically tailored to a particular digital image. For example, the color editing optimization system can receive an indication of a digital image in response to a client computing device opening the digital image for editing (e.g., within a digital content editing system application installed on the client computing device). Additionally or alternatively, the color editing optimization system can receive an indication of the digital image in response to detecting an upload of the digital image, a file transfer of the digital image, and/or another type of selection of the digital image.

In one or more embodiments, in order to generate a customized editing user interface customized to the digital image, the color editing optimization system can analyze pixels of the digital image to determine dominant colors in the digital image. For example, the color editing optimization system can utilize clustering to identify dominant colors. To illustrate, the color editing optimization system can group similar pixels of the digital image by color into clusters of color data points in a color space.

In one or more embodiments, the color editing optimization system can compare sizes of clusters of color data points in the color space to determine dominant colors within the digital image. For example, the color editing optimization system can determine that a mean color data point in a particular cluster of color data points is representative for the colors in that cluster. If the size of the cluster is larger than the other generated clusters of color data points, the color editing optimization system can determine that the representative color data point is a dominant color for the digital image. The color editing optimization system can continue the same process to determine a threshold number of other dominant colors for the digital image.

The color editing optimization system can further generate a customized editing user interface of selectable color controls that correspond to the identified dominant colors from the digital image, such a detected selection of one of the selectable color controls causes all the corresponding pixels in the digital image to become editable within the digital image. Additionally, in response to a detected selection of one of the selectable color controls in the customized editing user interface, the color editing optimization system can also highlight one or more contour paths corresponding to the selected color in the digital image, based on the generated clusters for the digital image. In this manner, the color editing optimization system can illustrate areas in the digital image that are affected by characteristic changes to the selected color.

As mentioned above, conventional systems have a number of technical shortcomings in relation to flexibility, efficiency, and accuracy with regard to providing color options relative to editing tools. For example, conventional systems are inefficient because they expend computing resources in providing only default color selections. As mentioned above, conventional systems generally provide eight default colors for a user to select and edit, regardless of whether any of those default colors are actually present in the digital image currently being edited. Thus, for example, conventional systems waste computing resources (such a user interface real-estate) in providing editing tools for the color purple when the color purple is not present in the current digital image being edited.

Additionally, conventional systems are inflexible because they provide default color selections only in a static, predetermined order. For example, as mentioned above, conventional systems generally provide eight default colors for a user to select and edit; always in the same order (e.g., ROYGBIV order) regardless of colors that are present in the digital image currently being edited. This often leads to user confusion as this predetermined order incorrectly indicates a non-existent order of color dominance within the digital image.

Moreover, conventional systems are inaccurate because their default color selections generally do not reflect the actual colors present in the digital image currently being edited. For example, a digital image may include a dominant color that is not one of the eight default color selections provided by a conventional system. Thus, in order to edit hue, saturation, and luminance for the dominant color, the user must attempt to select the nearest default color provided by the conventional system. This leads to inaccuracies in the resulting color edits.

As illustrated by the foregoing discussion, the present disclosure utilizes a variety of terms to describe features and advantages of the color editing optimization system. For example, as used herein, the term "digital image" refers to a digital visual representation (e.g., digital symbol, picture, icon, or illustration). For example, the term "digital image" includes digital files with the following file extensions: JPG, TIFF, BMP, PNG, RAW, or PDF. A digital image can include a part or portion of other digital visual media. For instance, a digital image include can include one or more frames of a digital video. Accordingly, digital images can also include digital files with the following file extensions: FLV, GIF, MOV, QT, AVI, WMV, MP4, MPG, MPEG, or M4V. Indeed, although many example embodiments are described in relation to digital images, the color editing optimization system can also generate customized editing user interfaces in relation to digital video editing.

As used herein, a "pixel" refers to the smallest unit of color data in a digital image. For example, a digital image is generally a grid of pixels where each pixel has an RGB (e.g. red, green, blue) value. While each pixel may be very small when displayed, a digital image is understandable by including a large number of pixels with a range of color values.

As used herein, a "color data point" refers to a data unit that corresponds to a pixel in a digital image. For example, the color editing optimization system can place color data points in a color space at color data point locations that represent the RGB value of corresponding pixels in a digital image. Thus, the resulting color space of color data points can represent the pixel information within the corresponding digital image. In one or more embodiments, the color space can be three-dimensional so that each color data point location represents a tree coordinate color system (e.g., RGB colors, LAB colors).

As used herein, a "cluster" refers to a partition of color data points in a color space. In one or more embodiments, the color editing optimization system can generate a predetermined number of clusters of all data points in a color space. Additionally, the color editing optimization system can re-cluster a particular cluster, to create a nested hierarchy of partitions.

As used herein, an "customized editing user interface" refers to a panel of selectable color controls displayed in connection with a digital image and one or more color-based editing tools. In response to a detected selection of a color control in the customized editing user interface, the color editing optimization system can enable editing of pixels in the digital image that are associated with the selected color control based on the clusters generated for that digital image. Some color-based editing tools include a hue editing tool, a saturation editing tool, and a luminance editing tool.

Additional detail regarding the color editing optimization system will now be provided with reference to the figures. For example, FIG. 1 illustrates a schematic diagram of an example system environment 100 for implementing a color editing optimization system 102 in accordance with one or more embodiments. Thereafter, a more detailed description of the components and processes of the color editing optimization system 102 is provided in relation to the subsequent figures.

As shown in FIG. 1, the environment 100 includes server(s) 106, a client computing device 112, and a network 110. Each of the components of the environment 100 can communicate via the network 110, and the network 110 may be any suitable network over which computing devices can communicate. Example networks are discussed in more detail below in relation to FIG. 12.

As mentioned, the environment 100 includes the client computing device 112. The client computing device 112 can be one of a variety of computing devices, including a smartphone, tablet, smart television, desktop computer, laptop computer, virtual reality device, augmented reality device, or other computing device as described in relation to FIG. 12. Although FIG. 1 illustrates a single client computing device 112, in some embodiments the environment 100 can include multiple different client computing devices, each associated with a different user. The client computing device 112 can further communicate with the server(s) 106 via the network 110. For example, the client computing device 112 can receive user input (e.g., a selection of a digital image to be edited) and provide the information pertaining to user input to the server(s) 106.

In one or more embodiments, the client computing device 112 includes a digital content editing system application 114. In particular, the digital content editing system application 114 may be a web application, a native application installed on the client computing device 112 (e.g., a mobile application, a desktop application, etc.), or a cloud-based application where part of the functionality is performed by the server(s) 106. The digital content editing system application 114 can modify or revise digital images via the computing device 112 (e.g., digital images stored on or accessed by the computing device 112). The digital content editing system application 114 can also present or display information to a user, including a customized editing user interface generated by the color editing optimization system 102.

As illustrated in FIG. 1, the environment 100 includes the server(s) 106. The server(s) 106 may include one or more individual servers that may generate, store, receive, and transmit electronic data. For example, the server(s) 106 may receive data from the client computing device 112 in the form of a user input such as a color selection relative to a digital image to be edited. In addition, the server(s) 106 can transmit data to the client computing device 112. Furthermore, the server(s) 106 can include one or more machine learning models. In some embodiments, the server(s) 106 comprises a content server. The server(s) 106 can also comprise an application server, a communication server, a web-hosting server, a social networking server, or a digital content analytics server.

As shown in FIG. 1, the server(s) 106 can also include the color editing optimization system 102 as part of a digital content editing system 104. The digital content editing system 104 can communicate with the client computing device 112 to generate, modify, store, and transmit digital content. For example, the digital content editing system 104 can capture, store, manage, and edit digital images (and receive user inputs comprising an intent to modify the digital images). Similarly, the digital content editing system 104 can gather, manage, and analyze digital data collected from a variety of client computing devices. Furthermore, in one or more embodiments, the client computing device 112 can download the digital content editing application 114 from the server(s) 106 or the digital content editing application 114 can be a web-based application hosted by the server(s) 106.

Although FIG. 1 depicts the color editing optimization system 102 located on the server(s) 106, in some embodiments, the color editing optimization system 102 may be implemented by (e.g., located entirely or in part) on one or more other components of the environment 100. For example, the color editing optimization system 102 may be implemented by the client computing device 112.

In some embodiments, although not illustrated in FIG. 1, the environment 100 may have a different arrangement of components and/or may have a different number or set of components altogether. For example, the client computing device 112 may communicate directly with the color editing optimization system 102, bypassing the network 110. The color editing optimization system 102 can be implemented in a variety of different ways across the server(s) 106, the network 110, and the client computing device 112. Additional detail regarding implementing different components of the color editing optimization system 102 across devices is provided below.

Figure 2A:
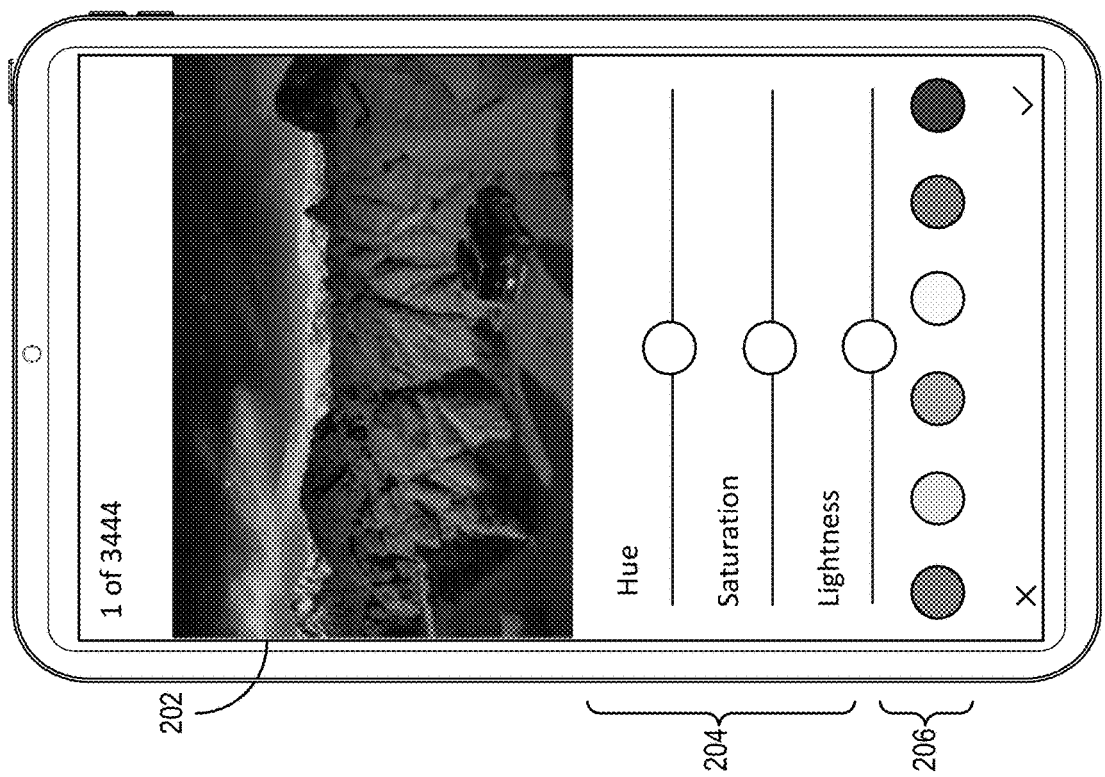

To further illustrate problems solved by the color editing optimization system 102, FIG. 2A shows an example embodiment of conventional systems found in the prior art. As shown in FIG. 2A, in response to an indication of a digital image to be edited 202, conventional systems provide image editing tools 204 relative to a default set of colors indicated by color controls 206. For example, conventional systems generally provide the set of color controls 206 including the same color options, regardless of colors present in the digital image 202. The set of color controls 206 typically correspond to eight default color options in the same order (e.g., ROYGBIV order), with the color option farthest to the left automatically selected.

The example embodiment of conventional systems illustrated in FIG. 2A is problematic for several reasons. For example, the default set of colors and automatic color control selection are not relevant to the digital image 202. As such, conventional systems generally provide no way of supporting precise color modifications in a digital image to be edited. For example, as shown in FIG. 2A, if a user wants to modify a color in the digital image 202 that is not included in the set of colors 206, the user must select a nearest color that is included in the set of colors 206. But modifying this nearest color may have unintended consequences within the digital image 202 (e.g., other ranges of colors that include the nearest color may be unintentionally modified).

The color editing optimization system 102 solves these and other problems over the prior art. For example, as shown in FIG. 2B (and as will be discussed in more detail below with regard to FIGS. 3-10), the color editing optimization system 102 generates a dynamic and customized editing user interface 210 that is specifically tailored to the digital image 202. Specifically, the color editing optimization system 102 provides selectable color options 208 that correspond to the dominant colors in the digital image 202 and are ordered by dominance. Thus, when a user edits the digital image 202 utilizing any of the editing tools 212, he or she can do so by selecting color options within the customized editing user interface 210 that directly correlate to dominant color distributions in the digital image 202. Thus, the color editing optimization system 102 enables precise modification of colors in the digital image 202. The process by which the color editing optimization system 102 generates the customized editing user interface 210, as well as provides other interactive color modification features, is now discussed in greater detail.

Figure 3:
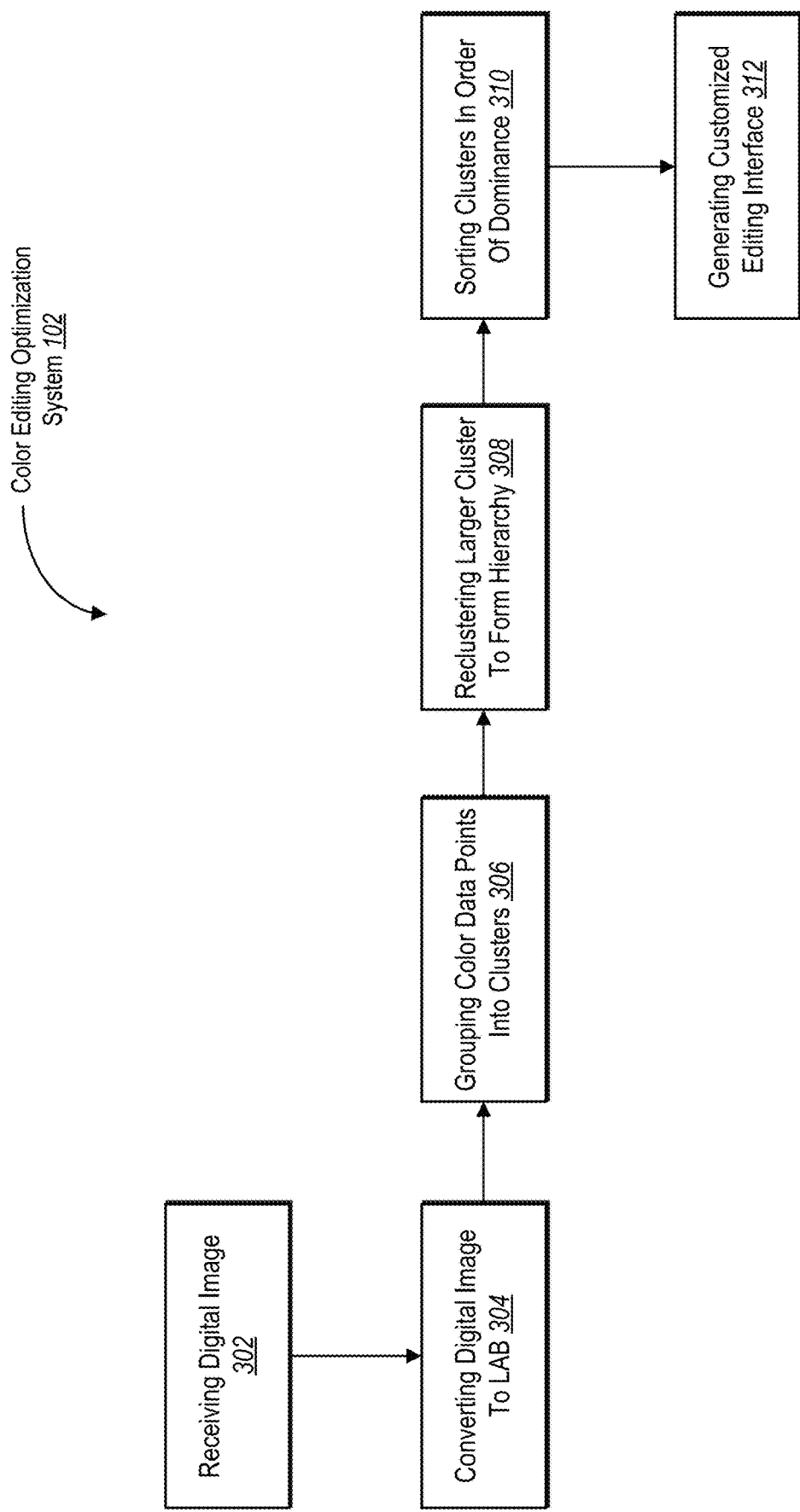
FIG. 3 illustrates an overview flowchart of generating a customized editing user interface tailored to a digital image to be edited in accordance with one or more embodiments.

FIG. 3 illustrates an overview of generating a customized editing user interface in accordance with one or more embodiments. Specifically, FIG. 3 illustrates the color editing optimization system 102 performing a series of acts 302-312 in generating and providing a customized editing user interface to a client computing device. In one or more embodiments, FIG. 3 comprises acts (or structure) for a step for generating a customized editing user interface with selectable color options customized to dominant colors in the digital image For example, as illustrated in FIG. 3, the color editing optimization system 102 performs an act 302 of receiving a digital image to be edited. In one or more embodiments, the color editing optimization system 102 can receive a digital image to be edited in response to a detected selection of the digital image for editing. Additionally or alternatively, the color editing optimization system 102 can receive a digital image to be edited in response to a detected upload of the digital image via the digital content editing system application 114 on the client computing device 112. Additionally or alternatively, the color editing optimization system 102 can receive a digital image to be edited as part of a batch when the digital content editing system application 114 initializes and/or is installed on the client computing device 112.

As further illustrated in FIG. 3, the color editing optimization system 102 can also perform an act 304 of converting the digital image to the LAB color space. In one or more embodiments, the digital content editing system application 114 displays a digital image to be edited in RGB (e.g., red, green, blue) because typical computing displays function in the RGB color space. Despite this, other color spaces cover a spectrum of color that is closer to what the human eye can perceive. As such, the color editing optimization system 102 can convert the digital image from the RGB color space to a broader color space, such as the LAB color space. By analyzing digital images in the LAB color space, the color editing optimization system 102 can provide greater precision in color identification and modification. The process by which the color editing optimization system 102 converts a digital image to be edited from one color space to another is discussed in greater detail below with regard to FIGS. 4A-4C.

The color editing optimization system 102 can also perform an act 306 of grouping color data points into clusters. For example, as a result of converting the digital image into a second color space, the color editing optimization system 102 is left with color data points in the second color space at color data point locations that correspond to the color values of pixels in the digital image. In one or more embodiments, the color editing optimization system 102 groups the color data points in the second color space into clusters by partitioning the second color space such that each color data point in the second color space is grouped with a nearest cluster centroid or mean color data point (e.g., a color data point that represents the center of the cluster). In at least one embodiment, the color editing optimization system 102 can use a clustering technique such as K-Means clustering to generate the clusters of color data points. This process is discussed in greater detail below with regard to FIGS. 5A-5C.

As shown in FIG. 3, the color editing optimization system 102 can also perform an act 308 of re-clustering larger clusters in the second color space to form color hierarchies. For example, the clustering act described above maps color data points to a single representative color (e.g., the mean color data point for the given cluster). As such, a single cluster can include many sub-dominant colors. Accordingly, the color editing optimization system 102 can re-cluster a larger cluster in order to form a hierarchy of sub-dominant colors within that cluster. In at least one embodiment, the color editing optimization system 102 can again repeat the re-clustering to form third or fourth level clusters in the same main cluster to form additional hierarchies of color. Re-clustering is discussed in greater detail below with regard to FIGS. 6A-6D.

The color editing optimization system 102 can also perform an act 310 of sorting clusters in order of dominance relative to the digital image. In one or more embodiments, the most dominant colors in the digital image represent the largest clusters in the second color space. Accordingly, the color editing optimization system 102 can determine dominant clusters based on cluster size. The process by which the color editing optimization system 102 sorts the generated clusters is discussed in greater detail below with regard to FIGS. 7A-7B.

As further shown in FIG. 3, the color editing optimization system 102 can perform an act 312 of generating a customized editing user interface that is tailored to the digital image. As discussed above, the color editing optimization system 102 utilizes a clustering technique to determine a predetermined number of relevant and dominant colors in the digital image. Accordingly, the color editing optimization system 102 can utilize those relevant and dominant colors to generate the customized editing user interface for the digital image. For example, rather than including a default number of standard color controls in a color display, the color editing optimization system 102 can generate the customized editing user interface to include selectable color controls that correlate directly to the representative colors from the most dominant clusters in the digital image. Further, the color editing optimization system 102 can include the selectable color options in order based on dominance with the most dominant color auto-selected. The process by which the color editing optimization system 102 generates the customized editing user interface is discussed in greater detail below with regard to FIGS. 6A-7B. Each of these and other acts will now be described in greater detail with reference to FIGS. 4A-9B.

Figure 4C:
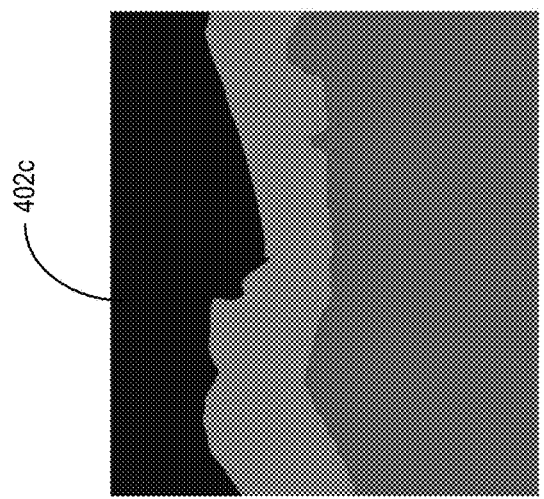
FIGS. 4A-4C illustrate an example of converting a digital image to be edited to a second color space in accordance with one or more embodiments.
Figure 4B:
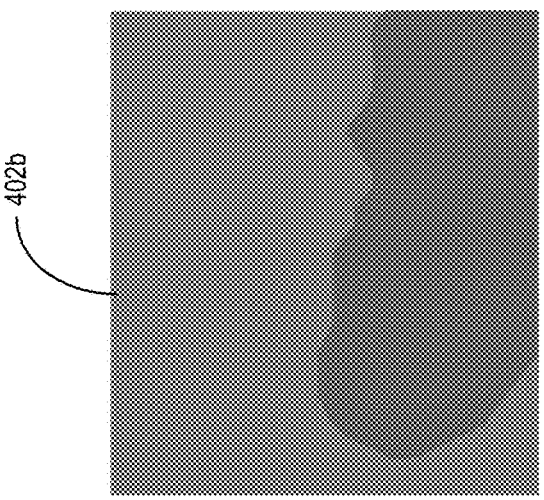
Figure 4A:
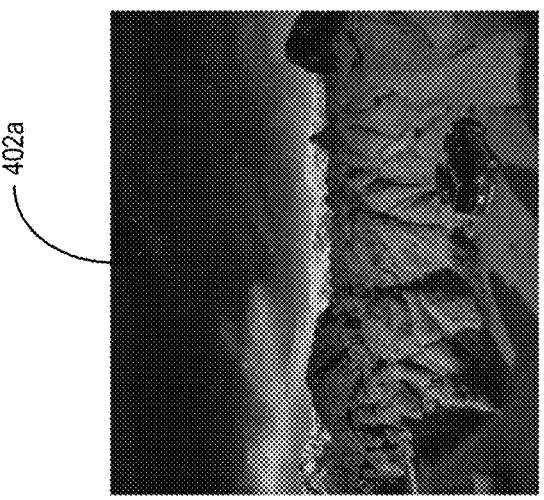

As mentioned above, the color editing optimization system 102 can receive an indication of a digital image, or the digital image, to be edited and then begin the process of generating a customized editing user interface tailored to that digital image by converting the pixels in the digital image from one color space to a second color space. FIGS. 4A-4C provide additional detail related to this color space conversion process.

FIG. 4A illustrates the digital image 402a prior to any color modifications. In one or more embodiments, the pixels in the unaltered digital image 402a are in a first color space, such as the RGB color space. For example, each pixel in the digital image 402a includes data representing three color values; one value for the color red, one value for the color green, and one value for the color blue. If mapped into a three-dimensional RGB color space with axes representing red/green/blue color values, the color editing optimization system 102 can represent each pixel as a color data point at a location along the red axis, the green axis, and the blue axis that corresponds to the red/green/blue color values for that pixel. Thus, the color editing optimization system 102 can represent the entire digital image 402a as color data points in the RGB color space. In at least one embodiment, the color editing optimization system 102 determine the distance between two color data points by taking the Euclidean distance between them.

As mentioned above, the RGB color space represents how computing devices display color. But the human eye sees colors in a more complex way, and therefore better suited to a more detailed color space. One such color space is the LAB color space, where color points are located along a luminance axis, a chromaticity-a axis, and a chromaticity-b axis. In one or more embodiments, the color editing optimization system 102 can convert each RGB pixel in the digital image 402a to a color data point in the LAB color space. For example, in at least one embodiment, the color editing optimization system 102 can perform this conversion by first transforming the RGB values for a pixel to XYZ coordinates, and then transforming the XYZ coordinates to LAB coordinates.

In additional or alternative embodiments, the color editing optimization system 102 can convert pixels from any first color space to any second color space. For example, the color editing optimization system 102 can convert the pixels of the digital image 402a from the RGB color space to the CMYK color space (e.g., cyan, magenta, yellow, key (black)).

After mapping the pixels in the digital image 402a to the LAB color space, the color editing optimization system 102 can determine the distance between any two color data points. For example, the color editing optimization system 102 can determine the distance between any two color data points in the LAB color space by taking the Euclidean distance between the two color points.

In one or more embodiments, the benefit of converting the pixels of the digital image 402a from a first color space, such as the RGB color space, to a second color space, such as the LAB color space, is illustrated by displaying a segmentation of both color spaces. For example, FIG. 4B shows the digital image 402b as a representation of the corresponding color data points associated with the digital image 402a in the segmented RGB color space. FIG. 4C shows the digital image 402c as a representation of the corresponding color data points associated with the digital image 402a in the segmented LAB color space.

As shown, the digital image 402c is more understandable and meaningful relative to the digital image 402a. For example, the digital image 402c includes more color ranges along display curves that more closely resemble those in the digital image 402a. The digital image 402c also includes color progressions that are closer to those found in the digital image 402a.

As mentioned above, the color editing optimization system 102 can determine dominant colors in a digital image to be edited by utilizing a clustering technique in connection with color data points representing the digital image. FIGS. 5A-5C illustrate additional detail regarding one example clustering technique utilized by the color editing optimization system 102 in order to identify dominant colors in a digital image to be edited.

By applying the conversion discussed above, the color editing optimization system 102 can generate a plurality of color data points in the second color space 504 (as shown in FIG. 5B) mapped to pixels in the digital image 502 (as shown in FIG. 5A). For example, the color editing optimization system 102 can generate color data points in the second color space 504 representing every pixel in the digital image 502. In one or more embodiments, as discussed above, the color editing optimization system 102 can generate a color data point mapped to a particular pixel by placing the color data point at a color data point location in the second color space 504 that is at a position along the luminance axis that corresponds to the luminance value for the pixel, at a position along the chromaticity-a axis that corresponds to the chromaticity-a value for the pixel, and at a position along the chromaticity-b axis that corresponds to the chromaticity-b value for the pixel. In additional embodiments, the color editing optimization system 102 can generate color data points in another color space representing pixels in the digital image 502 utilizing any other suitable technique.

After generating color data points mapped to each pixel in the digital image 502, the color editing optimization system 102 can generate clusters of color data points in the second color space 504. In at least one embodiment, in order to generate the plurality of clusters 506a-506h of color data points in the second color space 504, as shown in FIG. 5C. In one or more embodiments, the color editing optimization system 102 can utilize K-Means clustering. For example, the color editing optimization system 102 can utilize K-Means clustering to find partitions in the second color space 504 such that color data points within each cluster are as close to each other as possible, while simultaneously being as far away from data points in other clusters as possible.

More specifically, K-Means clustering typically functions over multiple iterations, where the color editing optimization system 102 randomly assigns n cluster centroids (e.g., the central color data point in a cluster) in the first iteration. In one or more embodiments, the number (e.g., "n") of clusters can be automatically assigned by the color editing optimization system 102. Additionally or alternatively, a user of the client computing device 112 can assign the number of clusters for the color editing optimization system 102 to find, or the number can be universally assigned by a system administrator. As mentioned above, and as will be discussed in greater detail below, the number of clusters that the color editing optimization system 102 finds in the current color space will be the number of selectable color controls in the customized editing user interface generated for the digital image.

Over multiple successive iterations, the color editing optimization system 102 refines the centroid assignments for the n clusters until the assignments no longer change from one iteration to another. At this point, the color editing optimization system 102 has converged the centroids to color data points within each of the n clusters that are a minimum distance from each of the color data points in each n cluster, respectively while ensuring that each of the color data points in each of the n clusters are a maximum distance away from centroids in other clusters.

To illustrate, the color editing optimization system 102 generates each of the clusters 506a-506h in response to performing multiple iterations on the color data points in the second color space 504. The resulting clusters 506a-506h include color data points that are a minimum distance away from a centroid or mean color data point in each cluster, while simultaneously being a maximum distance away from the centroid or mean color data points in each of the other clusters. Thus, the resulting clusters include a central color data point surrounded by a plurality of similar color data points.

While each cluster is represented by the centroid or mean color data point (e.g., a single color), each cluster includes a range of colors. Thus, as will be discussed in greater detail below, pixels in the digital image 502 that correspond with a range of colors in a particular cluster in the second color space 504 can all be represented in a segmented version of the digital image 502 as the centroid or mean color data point for the particular cluster.

In one or more embodiments, the color editing optimization system 102 identifies the centroid or mean color data point in each of the clusters 506a-506h as the representative color for each of the other color data points in the associated cluster. In at least one embodiment, the color editing optimization system 102 utilizes the one or more representative colors to generate the customized editing user interface for the digital image (e.g., the digital image 502). For example, the color editing optimization system 102 can generate a customized editing user interface with selectable color option that correlate to each of the representative colors taken from the clusters 506a-506h in the second color space 504.

Although the color editing optimization system 102 is described herein as utilizing K-Means clustering to identify dominant colors in the digital image 502, the color editing optimization system 102 can utilize other clustering methodologies in other embodiments to the same end. For example, the color editing optimization system 102 can generate clusters of color data points utilizing mean-shift clustering that forms clusters by iteratively identifying centroids within dense areas of data points. Alternatively, the color editing optimization system 102 can generate clusters of color data points utilizing expectation-maximization clustering. Additionally or alternatively, the color editing optimization system 102 can utilize any appropriate clustering method to generate clusters of color data points in order to identify dominant colors in a corresponding digital image.

Figure 6B:
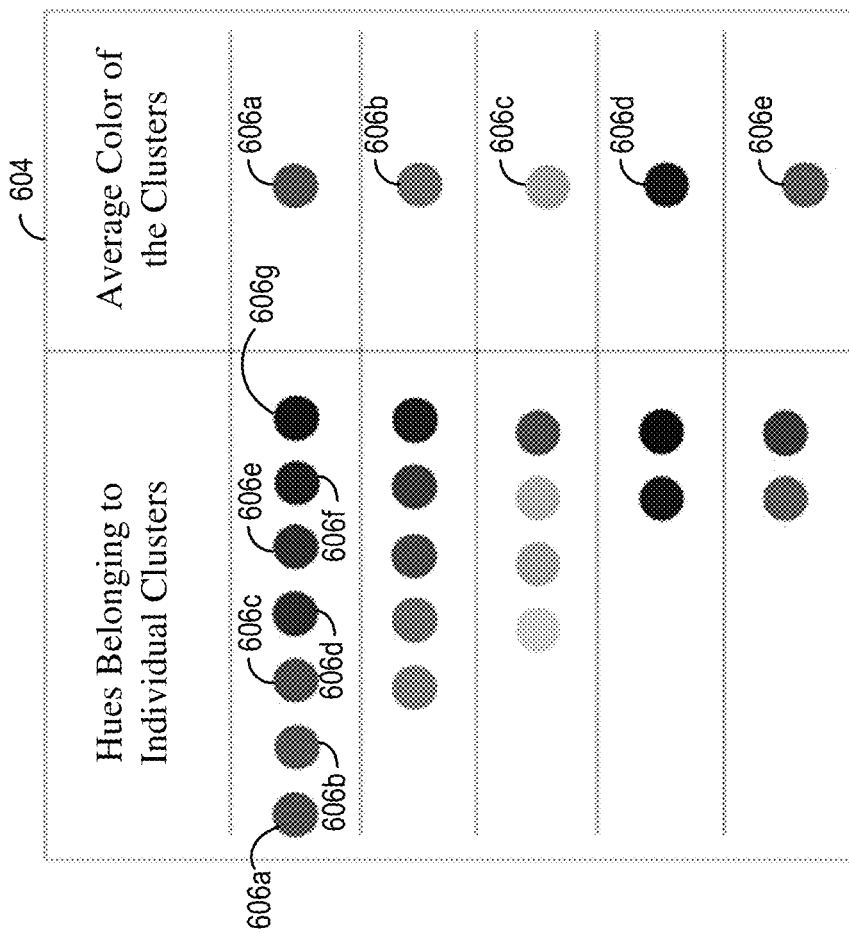
FIGS. 6A-6D illustrate an example of clustering and re-clustering color data points associated with a digital image to be edited in accordance with one or more embodiments.
Figure 6A:
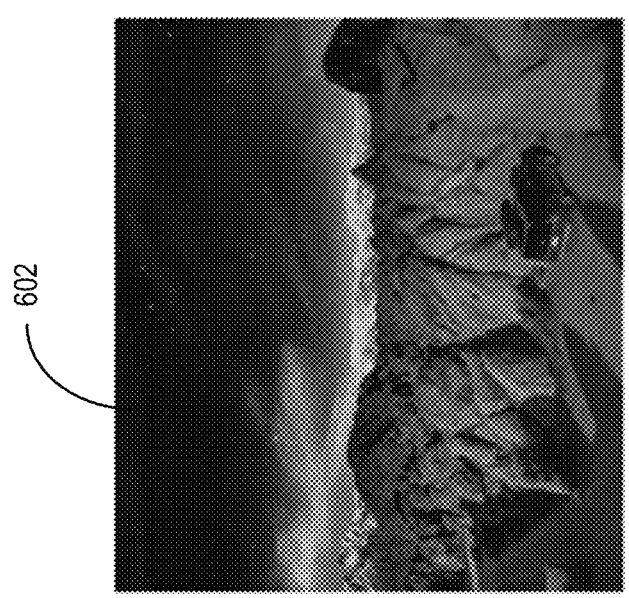

In one or more embodiments, the color editing optimization system 102 can generate a hierarchy of color dominance within the generated clusters in order to provide more precise color choices relative to a digital image to be edited. For example, as shown in FIGS. 6A and 6B, the color editing optimization system 102 can utilize K-Means clustering, as discussed above, to determine the "Average Color of the Clusters" (e.g., the mean or centroid color data point from each of the generated cluster 506a-506h in the second color space 504 shown in FIG. 5C) illustrated in the chart 604 in FIG. 6B and relative to the digital image 602 in FIG. 6A.

As further shown in the chart 604, each of the average colors 606a-606e is associated with several other colors (e.g., "Hues belonging to individual clusters"). For example, the average color 606a may be the centroid color data point from the cluster 506a, shown in FIG. 5C. In one or more embodiments, the color editing optimization system 102 can re-cluster each of the clusters associated with the average colors 606a-606e to identify one or more sub-dominant colors. For example, the color editing optimization system 102 may re-cluster the cluster 506a to identify the sub-dominant colors 608a-608g, shown in FIG. 6B.

In one or more embodiments, the color editing optimization system 102 may re-cluster a cluster by first determining that the cluster is larger than a threshold size. For example, in order to save time and computing resources, the color editing optimization system 102 may only re-cluster clusters that contain more than a threshold number of color data points. Alternatively, the color editing optimization system 102 may only re-cluster generated clusters to a predetermined level (e.g., may only re-cluster all clusters three times) in order to avoid computing resource waste. In one or more embodiments, the threshold number of color data points and/or the maximum level of re-clusters may be a system setting that can be set by the user of the client computing device 112 via the digital content editing system application 114, or by a system administrator via the digital content editing system 104.

The color editing optimization system 102 may continue the re-clustering process by again applying the K-Means clustering technique to the selected cluster, while treating the selected cluster as a unitary color space. For example, the color editing optimization system 102 can again partition the selected cluster into n sub-clusters in order to find a mean or centroid color data point in each sub-cluster. In one or more embodiments, the color editing optimization system 102 can generate an association between the main cluster centroid color and each of the sub-cluster centroid colors, such as shown in the chart 604 in FIG. 6B. In additional or alternative embodiments, the color editing optimization system 102 can represent the associated between the main cluster centroid color and each of the sub-cluster centroid colors in any appropriate way, such as in a flat file, a series of points, a database, etc.

In at least one embodiment, the color editing optimization system 102 can utilize these associations to generate the customized editing user interface associated with the digital image 602. For example, as shown in FIG. 6C, the color editing optimization system 102 can generate and provide the customized editing user interface 610 tailored to the digital image 602 within a digital image editing user interface 612 (e.g., via the digital content editing system application 114 on the client computing device 112).

Figure 6C:
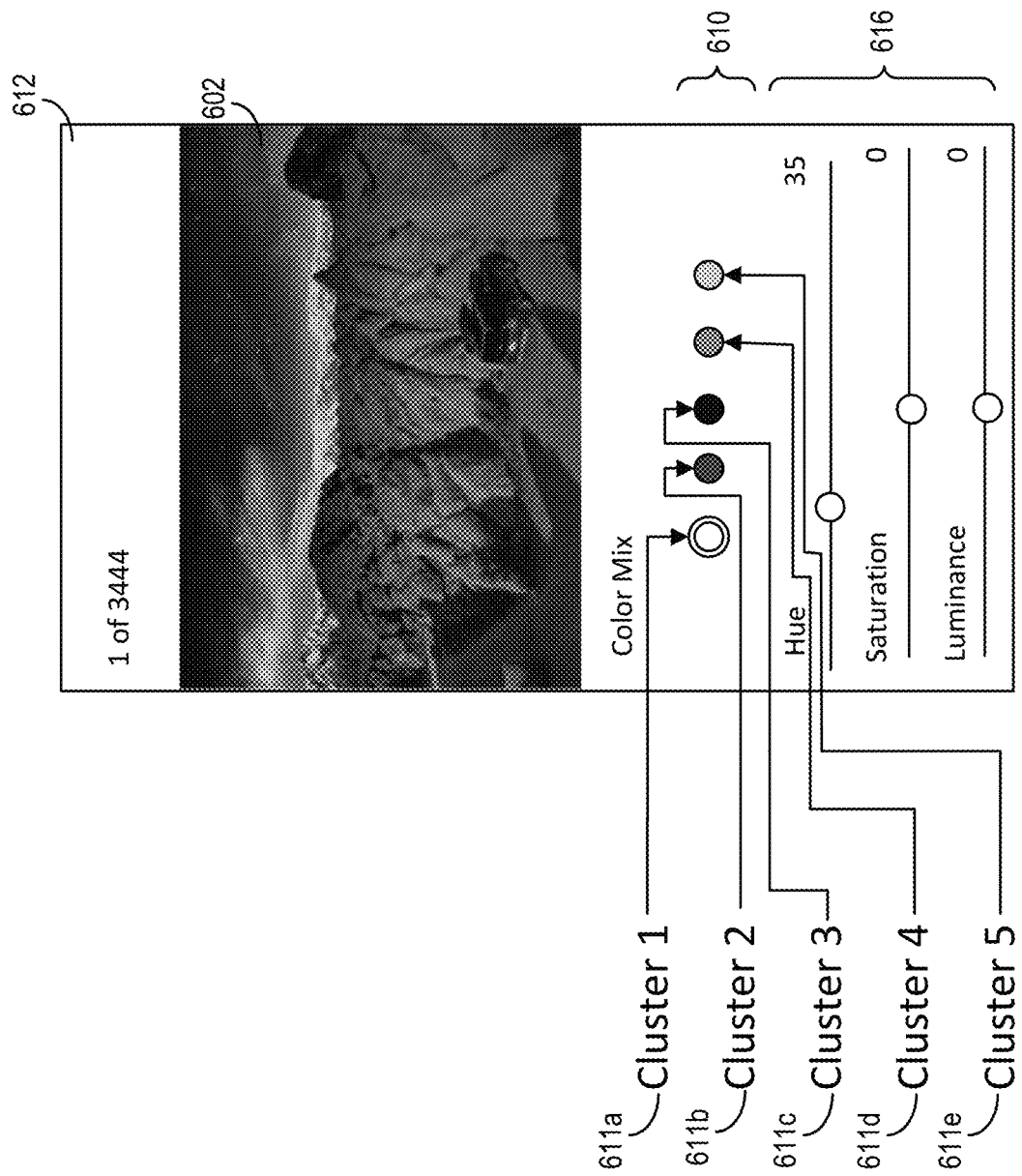

As shown in FIG. 6C, the color editing optimization system 102 generates the customized editing user interface 610 to include the selectable color controls 611a-611e. In one or more embodiments, the selectable color controls 611a-611e correlate directly with the average colors 606a-606e, shown in FIG. 6B, which in turn correlate directly with the mean color data points of the dominant clusters 506a-506e, shown in FIG. 5C.

For example, in response to a detected selection of the selectable color 611a in the customized editing user interface 610, the color editing optimization system 102 can enable the range of pixels in the digital image that are mapped to color data points in the cluster that corresponds to the selectable color 611a. With those pixels enabled, the color editing optimization system 102 can apply any modifications to hue, saturation, and/or luminance (e.g., indicated by changes to the editing tools 616) to those pixels. For example, in response to a detected change to the interactive hue control in the editing tools 616, the color editing optimization system 102 can modify the hue of any pixel in the digital image 602 that maps to a cluster that has the selectable color 611a as the mean or centroid color. Similarly, in response to a detected change to the interactive saturation control in the editing tools 616, the color editing optimization system 102 can modify the saturation level of any pixel in the digital image 602 that maps to a cluster that has the selectable color 611a as the mean or centroid color. Additionally, in response to a detected change to the interactive luminance control in the editing tools 616, the color editing optimization system 102 can modify the luminance of any pixel in the digital image 602 that maps to a cluster that has the selectable color 611a as the mean or centroid color. The color editing optimization system 102 can leave unchanged any pixels in the digital image 602 that are not enabled.

Figure 6D:
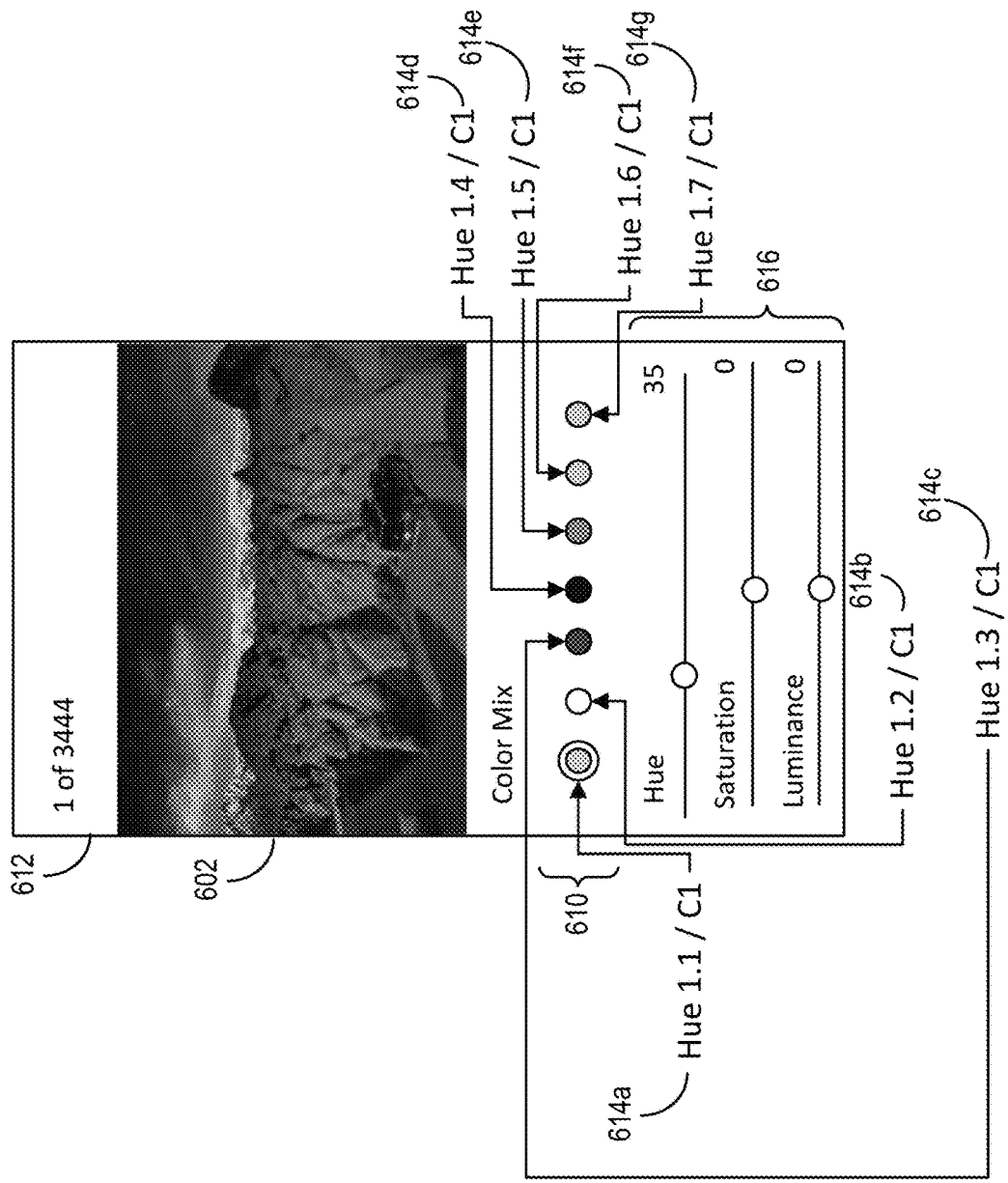

In one or more embodiments, the color editing optimization system 102 can further provide selectable color controls associated with sub-dominant mean colors identified through re-clustering of main clusters. As discussed above, this provides for greater color precision when applying modifications (e.g., to hue, saturation, luminance) to color pixels in the digital image 602. For example, as shown in FIG. 6D, in response to a detected interaction (e.g., a long-press) with the selectable color controls 611a, the color editing optimization system 102 can update the customized editing user interface 610 to include selectable sub-color controls 614a-614g associated with the correlating sub-dominant colors 608a-608g shown in the chart 604. In response to a selection of one of the selectable color controls 611a-611e and/or the selectable sub-color controls 614a-614g, the color editing optimization system can provide color editing tools 616 associated with pixels corresponding to the selected color relative to the digital image 602.

In order to generate a customized editing user interface that is easily understood by and most relevant to a user, the color editing optimization system 102 can sort clusters in order of dominance. In one or more embodiments, the color editing optimization system 102 can sort the clusters by size. For example, the color editing optimization system 102 can determine that the cluster with the highest number of color data points is the most dominant cluster (e.g., representing the most dominant mean color in the corresponding digital image). To illustrate, FIG. 7A shows clusters 702a-702g in a color space 704. As shown, the color editing optimization system 102 can determine that the cluster 702d is the most dominant cluster in the color space 704 by determining that the cluster 702d has the highest number of partitioned color data points. Similarly, the color editing optimization system 102 can determine that the cluster 702b is the second-most dominant cluster in the color space 704 based on the associated number of partitioned color data points.

Figure 7B:
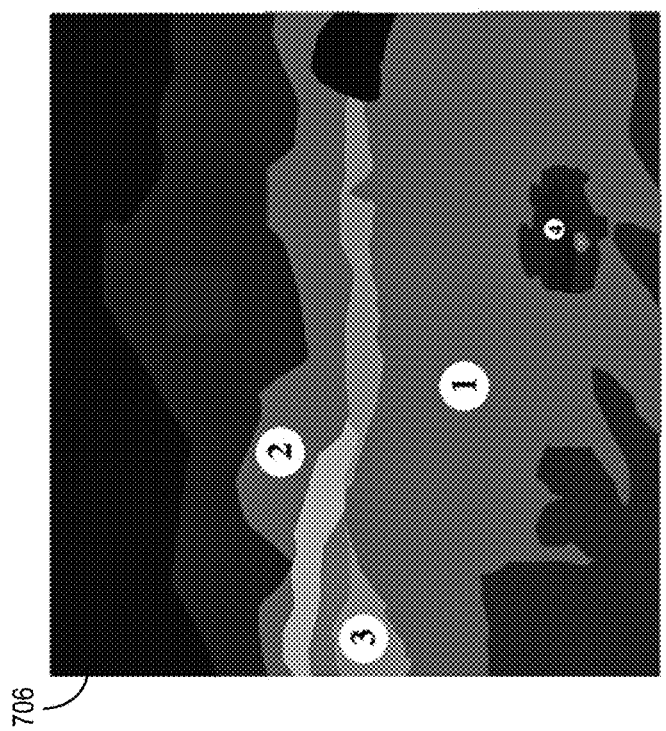
FIGS. 7A-7B illustrate an example of ordering clusters of color data points associated with a digital image to be edited in an order of dominance in accordance with one or more embodiments.
Figure 7A:
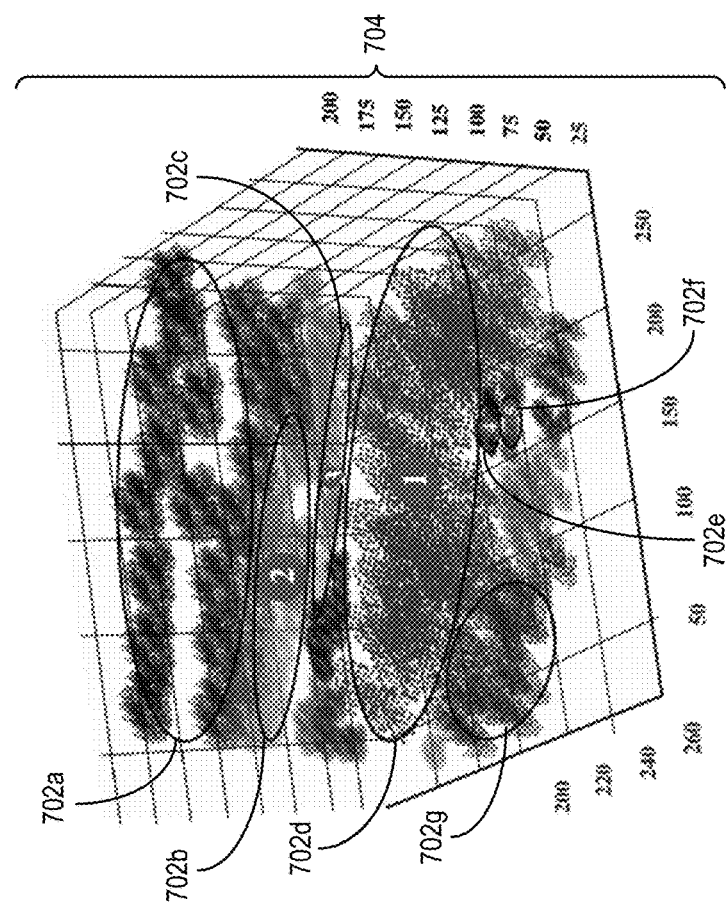

To further illustrate, FIG. 7B shows how the ordered dominant clusters in the color space 704 correlate with the corresponding digital image 706. For example, if the color editing optimization system 102 replaces every pixel in the digital image 706 with the mean color data point from cluster in which that pixel is grouped, the resulting display of the digital image 706 shows the most dominant mean colors (e.g., indicated by the numbers 1-4).

In additional embodiments, the color editing optimization system 102 can determine an order of dominance in the generated clusters of color data points in different ways. For example, in one embodiment, the color editing optimization system 102 can determine that the most dominant cluster is the one that takes up the most space in the color space 704. In other embodiment, the color editing optimization system 102 can determine that the most dominant cluster is the one that is spaced farthest from other clusters in the color space 704. Thus, the color editing optimization system 102 can utilize any of a variety of appropriate methodologies in determining cluster dominance. Regardless of the method of ordering, in one or more embodiments, the color editing optimization system 102 can auto-select the color option in the generated customized editing user interface that corresponds to the most dominant cluster in the ordered clusters.

To further facilitate precise editing of a digital image to be edited with color-based editing tools, the color editing optimization system 102 can convert pixel arrays in the digital image to one or more contour paths. In one or more embodiments, the contour paths enable the color editing optimization system 102 to highlight areas in the digital image that correspond to a selected color in the customized editing user interface. In this manner, the color editing optimization system 102 helps the user to quickly see which areas of the digital image will be affected by edits and/or modifications to characteristics and attributes of a selected color in the customized editing user interface.

To convert pixel arrays in the digital image to contour paths, the color editing optimization system 102 can, for each pixel in the digital image, identify a corresponding cluster for the pixel and replace the pixel in the digital image with the mean color data point from that cluster. In one or more embodiments, the color editing optimization system 102 can further utilize contour paths (e.g., Bezier paths, curves, etc.) to form areas of solid color within the digital image.

Figure 8B:
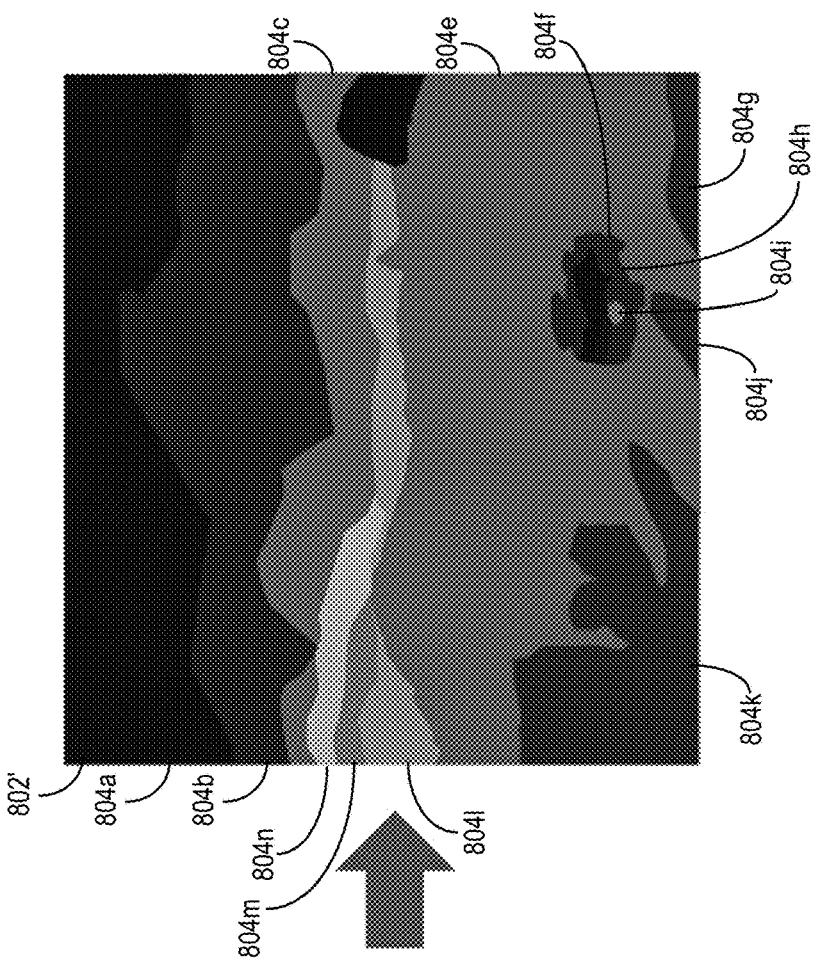
FIGS. 8A-8B illustrate an example of generating one or more contour paths in a digital image to be edited in accordance with one or more embodiments.
Figure 8A:

To illustrate, FIG. 8A shows the digital image 802, while FIG. 8B shows the modified digital image 802' after the conversion described above. For example, FIG. 8B illustrates the modified digital image 802' after the color editing optimization system 102 has converted the full pixel array to the contour paths 804a-804h. As shown, each contour path includes a single color. In one or more embodiments, the color within each contour path corresponds to a mean color data point from at least one cluster generated by the color editing optimization system 102 in association with the digital image 802.

Figure 9B:
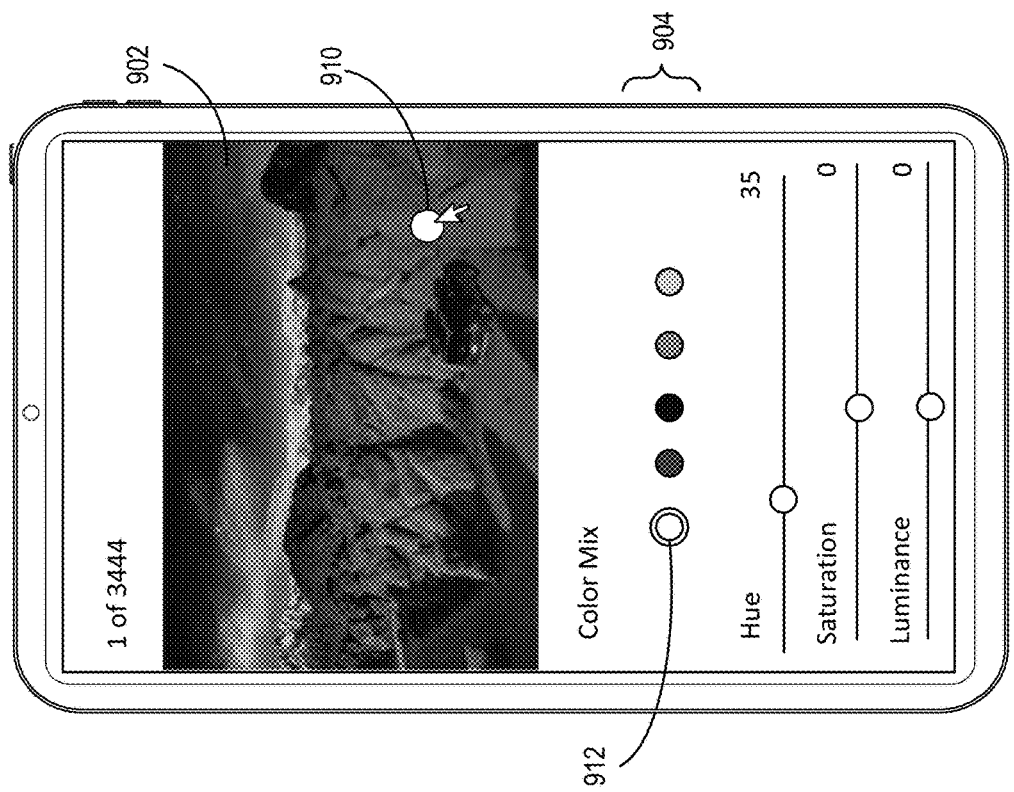
FIGS. 9A-9B highlighting one or more areas of a digital image to be edited in accordance with one or more embodiments.
Figure 9A:
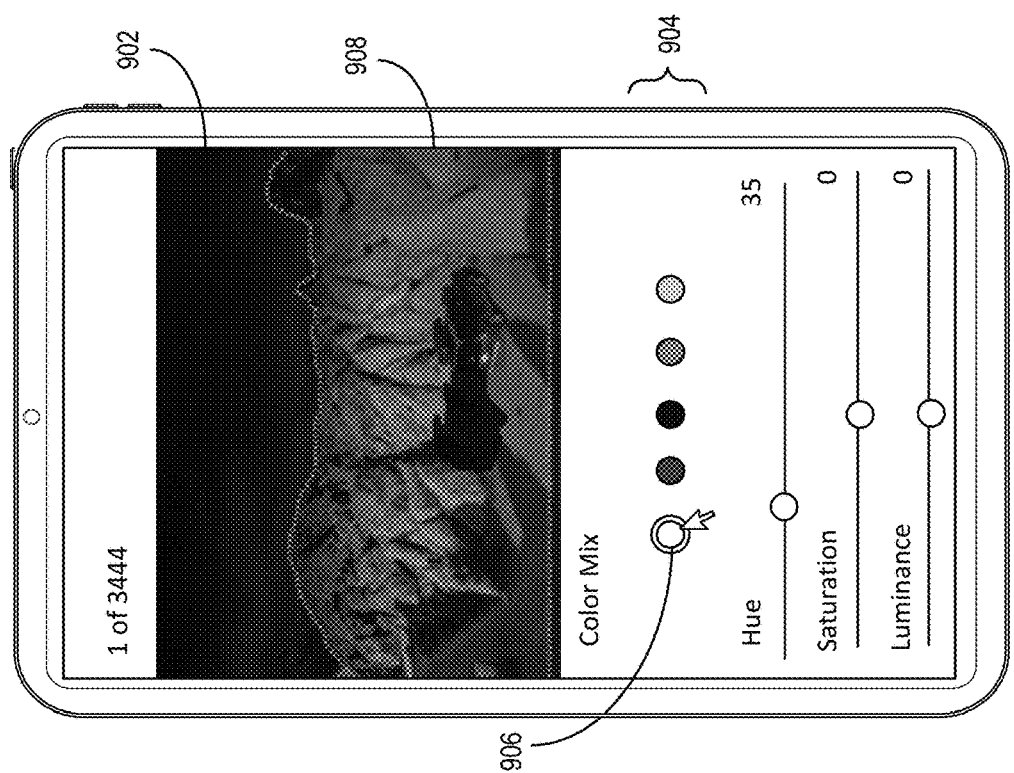

With the pixels of the digital image mapped to clusters of color data points in a color space, as well as with well-defined contours associated with those clusters, the color editing optimization system 102 can map the selectable color controls in the customized editing user interface to corresponding areas in the displayed digital image. For example, as shown in FIG. 9A, in response to a detected selection of the color control 906 within the customized editing user interface 904, the color editing optimization system 102 can generate the highlight 908 (e.g., dotted line) associated with the contour path that corresponds with the color(s) associated with selected color control 906. In one or more embodiments, the color editing optimization system 102 generates the highlight 908 to outline the previously generated contour path in the digital image 902. In additional embodiments, the color editing optimization system 102 can generate the highlight 908 to include a different outline pattern, a color, a blur effect, or any other type of highlight.

Additionally, after mapping the selectable color controls in a customized editing user interface to corresponding areas within contour paths in a displayed digital image, the color editing optimization system 102 can provide further functionality within the customized editing user interface. For example, as shown in FIG. 9B, in response to a detected user selection within an area in the digital image 902, the color editing optimization system 102 can auto-select the color control 912 that corresponds to the average color in the selected area in the digital image 902. In this way, the color editing optimization system 102 enables a user to precisely edit desired colors in the digital image 902.

The features and functionality of the color editing optimization system 102 are described relative to FIGS. 3-9B with regard to a full display of the digital image. In additional or alternative embodiments, the color editing optimization system 102 can perform the features and functionality relative to zoomed in portions of the same digital image. For example, in response to a detected zoom-in on a digital image to be edited, the color editing optimization system 102 can update the customized editing user interface for the digital image to include dominant colors of the displayed portion of the digital image. Similarly, the color editing optimization system 102 can determine contour paths in the displayed portion of the digital image.

Figure 10:
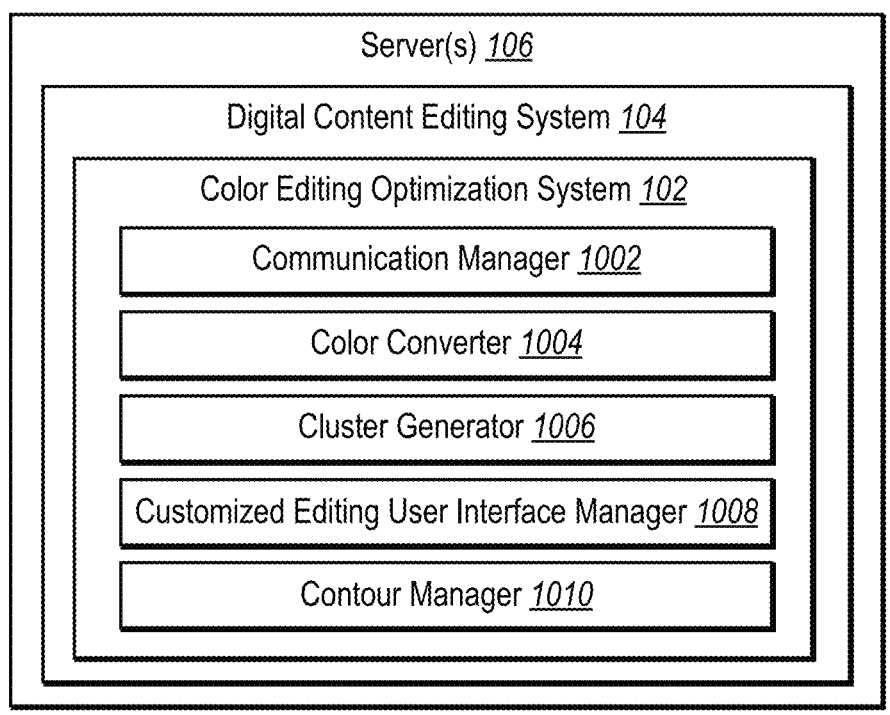
FIG. 10 illustrates a schematic diagram of the color editing optimization system in accordance with one or more embodiments.

As described in relation to FIGS. 1-9B, the color editing optimization system 102 generates a customized editing user interface with selectable color options specifically tailored to a digital image to be edited. FIG. 10 illustrates a detailed schematic diagram of an embodiment of the color editing optimization system 102 described above. Although illustrated on the server(s) 106, as mentioned above, the color editing optimization system 102 can be implemented by one or more different or additional computing devices (e.g., the client computing device 112). In one or more embodiments, the color editing optimization system 102 includes a communication manager 1002, a color converter 1004, a cluster generator 1006, a customized editing user interface manager 1008, and a contour manager 1010.

Each of the components 1002-1010 of the color editing optimization system 102 can include software, hardware, or both. For example, the components 1002-1010 can include one or more instructions stored on a computer-readable storage medium and executable by processors of one or more computing devices, such as a client device or server(s). When executed by the one or more processors, the computer-executable instructions of the color editing optimization system 102 can cause the computing device(s) to perform the methods described herein. Alternatively, the components 1002-1010 can include hardware, such as a special-purpose processing device to perform a certain function or group of functions. Alternatively, the components 1002-1010 of the color editing optimization system 102 can include a combination of computer-executable instructions and hardware.

Furthermore, the components 1002-1010 of the color editing optimization system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1002-1010 may be implemented as a stand-alone application, such as a desktop or mobile application. Furthermore, the components 1002-1010 may be implemented as one or more web-based applications hosted on a remote server. The components 1002-1010 may also be implemented in a suite of mobile device applications or "apps." To illustrate, the components 1002-1010 may be implemented in an application, including but not limited to ADOBE CREATIVE CLOUD, such as ADOBE PHOTOSHOP, ADOBE ACROBAT, ADOBE ILLUSTRATOR, ADOBE LIGHTROOM and ADOBE INDESIGN. "ADOBE", "CREATIVE CLOUD," "PHOTOSHOP," "ACROBAT," "ILLUSTRATOR," "LIGHTROOM," and "INDESIGN" are either registered trademarks or trademarks of Adobe Inc. in the United States and/or other countries.

As mentioned above, and as shown in FIG. 10, the color editing optimization system 102 includes a communication manager 1002. In one or more embodiments, the communication manager 1002 handles communications between the color editing optimization system 102 and other computing devices. For example, the communication manager 1002 can send and receive information to and from the client computing device 112. To illustrate, the communication manager 1002 can provide customized editing user interfaces, user interfaces, interface elements, and other information to the client computing device 112. The communication manager 1002 can also receive indications of user selections and requests associated with an image editing tool from the client computing device 112. As mentioned above, in one or more embodiments, the communication manager 1002 can send and receive information to the client computing device 112 via the digital content editing system application 114 installed on the client computing device 112.

As mentioned above, and as shown in FIG. 10, the color editing optimization system 102 also includes a color converter 1004. In one or more embodiments, the color converter 1004 converts data between color spaces. For example, as discussed above with reference to FIGS. 4A-4C, the color converter 1004 can transfer pixel data from the RGB color space to the LAB color space.

As further shown in FIG. 10, the color editing optimization system 102 includes a cluster generator 1006. In one or more embodiments, the cluster generator 1006 partitions a color space of color data points into n clusters. For example, as discussed above with reference to FIGS. 5A-5C, the cluster generator 1006 can generate clusters of color data points utilizing K-Means clustering, or any other suitable clustering technique.

In one or more embodiments, the cluster generator 1006 can re-cluster generated clusters. For example, the cluster generator 1006 can identify clusters that are larger than a threshold size or number of color data points and re-cluster those clusters to form a hierarchy of associated colors. In at least one embodiment, the cluster generator 1006 can cluster and re-cluster color data points in a color space until the resulting clusters are within a threshold size. Alternatively, the cluster generator 1006 can cluster and re-cluster color data points until a threshold hierarchy level is achieved (e.g., three levels).

In one or more embodiments, the cluster generator 1006 can also determine an order of dominance for one or more clusters generated with reference to a digital image to be edited. For example, as discussed above with reference to FIGS. 7A-7B, the cluster generator 1006 can determine an order of dominance based on a number of color data points in each generated cluster.

Also as shown in FIG. 10, the color editing optimization system 102 includes a customized editing user interface manager 1008. In one or more embodiments, the customized editing user interface manager 1008 generates a customized editing user interface for a digital image to be edited based on clusters corresponding to the digital image. For example, as discussed above with reference to FIGS. 6A-6D, the customized editing user interface manager 1008 can generate the customized editing user interface to include selectable color options that correspond to the centroid or mean color data point in each of the generated clusters for the digital image.

As mentioned above, and as shown in FIG. 10, the color editing optimization system 102 includes a contour manager 1010. In one or more embodiments, the contour manager 1010 generates one or more contour paths in a digital image to be edited. For example, as discussed above with reference to FIGS. 8A-9B, the contour manager 1010 can utilize clusters generated for a digital image to be edited to convert pixels arrays in the digital image to contour paths. In at least one embodiment, the contour manager 1010 can further generate contour path highlights corresponding to dominant colors included in the customized editing user interface.

Figure 11:
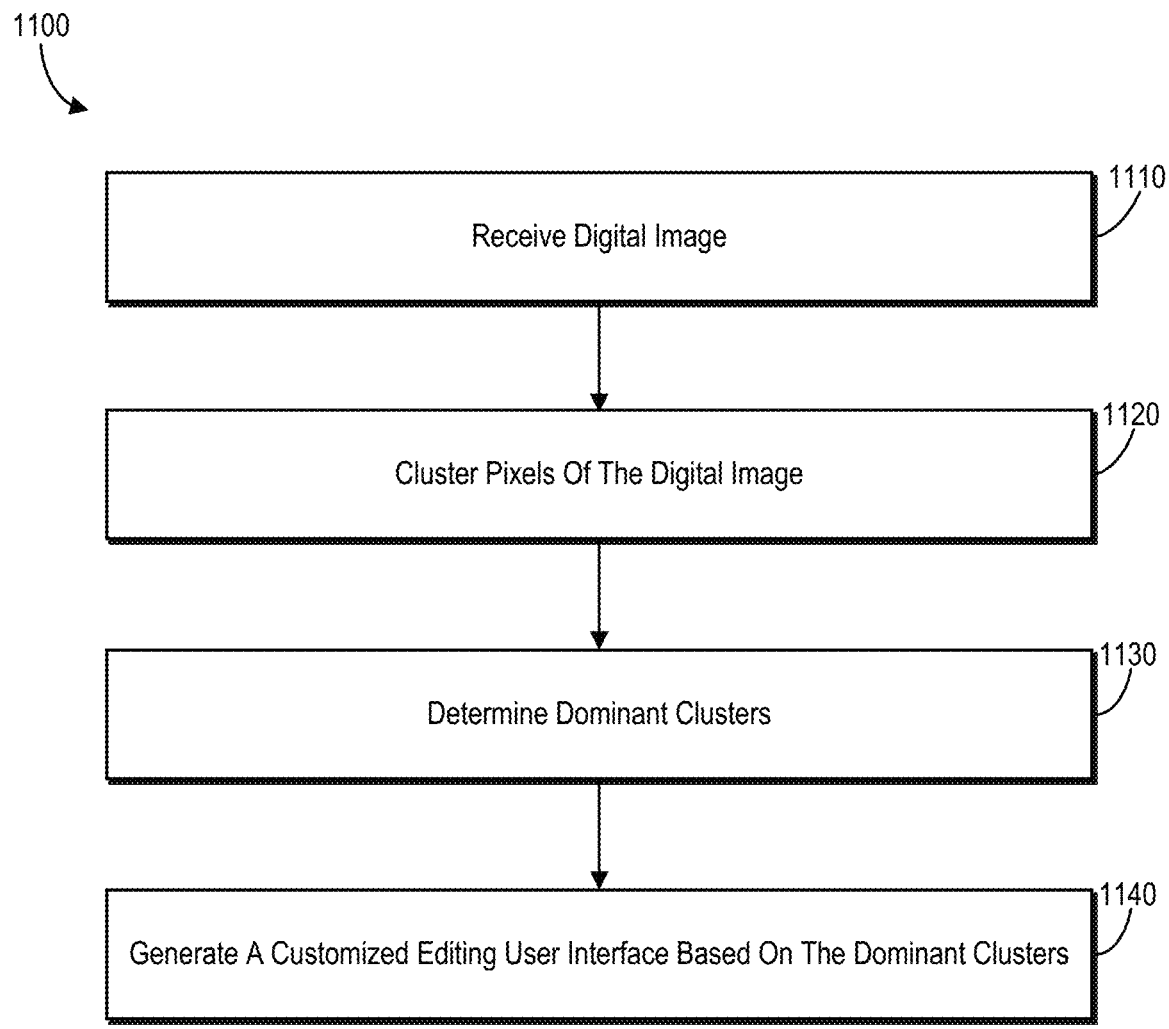
FIG. 11 illustrates a flowchart of a series of acts for generating a customized editing user interface tailored to a digital image to be edited in accordance with one or more embodiments.

FIGS. 1-10, the corresponding text, and the examples provide a number of different methods, systems, devices, and non-transitory computer-readable media of the color editing optimization system 102. In addition to the foregoing, one or more embodiments can also be described in terms of flowcharts comprising acts for accomplishing a particular result, as shown in FIG. 11. FIG. 11 may be performed with more or fewer acts. Further, the acts may be performed in differing orders. Additionally, the acts described herein may be repeated or performed in parallel with one another or parallel with different instances of the same or similar acts.

As mentioned, FIG. 11 illustrates a flowchart of a series of acts 1100 for generating a customized editing user interface specifically tailored to a digital image to be edited in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer-readable medium can comprise instructions that, when executed by one or more processors, cause a computing device to perform the acts of FIG. 11. In some embodiments, a system can perform the acts of FIG. 11.

As shown in FIG. 11, the series of acts 1100 includes an act 1110 of receiving a digital image to be edited. For example, the act 1110 can involve receiving an indication of a digital image to be edited. In one or more embodiments, receiving an indication of a digital image to be edited is in response to a detected selection of the digital image for editing.

As further shown in FIG. 11, the series of acts 1100 includes an act 1120 of clustering pixels of the digital image. For example, the act 1120 can involve clustering pixels of the digital image by color into a plurality of clusters of color data points. In one or more embodiments, clustering the pixels of the digital image by color into the plurality of clusters of color data points includes mapping the pixels as color data points to color data point locations within a second color space, and partitioning the color data points within the second color space into clusters so as to minimize a distance between the color data points and at least one cluster center.

In at least one embodiment, the series of acts 1100 can include in response to a detected selection a color control of the plurality of selectable color controls in the customized editing user interface, highlighting a portion of the digital image that corresponds to colors associated with the selectable color control. For example, highlighting the portion of the digital image that corresponds to the selected color in the customized editing user interface can involve determining a cluster of the plurality of clusters that corresponds to the selected selectable color control; determining a contour path that corresponds to the determined cluster; and highlighting portions of the digital image within the contour path by at least one of blurring the digital image within the contour path, animating the digital image within the contour path, or adding a dashed line along the contour path.

In at least one embodiment, the series of acts 1100 includes an act of, prior to clustering pixels of the digital image by color into a plurality of clusters of color data points, converting the pixels from a first color space to a second color space. For example, the first color space can be an RGB color space and the second color space can be a LAB color space.

In at least one embodiment, the series of acts 1100 also includes an act of re-clustering one or more of the plurality of clusters of color data points. For example, re-clustering one or more of the plurality of clusters of color data points can involve identifying clusters in the plurality of clusters larger than a threshold size, and partitioning the identified clusters into one or more sub-clusters so as to minimize a distance between color data points in the sub-clusters and sub-cluster centers.

Additionally, the series of acts 1100 includes an act 1130 of determining dominant cluster. For example, the act 1130 can involve determining a plurality of dominant clusters from the plurality of clusters of color data points. In at least one embodiment, the series of acts 1100 includes determining an order of dominance associated with the plurality of clusters of color data points. For example, determining the order of dominance associated with the plurality of clusters of color data points can include determining a number of color data points associated with each of the plurality of clusters, and ordering the plurality of clusters based on the determined numbers of color data points such that a cluster with a highest number of color data points is ordered first.

The series of acts 1100 includes an act 1140 of generating a customized editing user interface based on the dominant colors. For example, the act 1140 of generating a customized editing user interface of selectable color controls that correspond to the plurality of dominant clusters of the plurality of clusters of color data points, wherein a detected selection of one of the one or more selectable color controls enables corresponding pixels in the digital image to be edited.

In at least one embodiment, the series of acts 1100 includes detecting a first type of user input associated with one of the one or more selectable color controls in the customized editing user interface, and in response to the first type of user input, providing a selectable display of one or more selectable secondary color controls wherein each of the one or more selectable secondary color controls is associated with sub-clusters of color data points associated with the cluster of color data points associated with the selected color control.

Additionally, in at least one embodiment, the series of acts 1100 includes detecting a selection of one of the one or more selectable color controls in the customized editing user interface, and providing an interactive hue control associated with color(s) associated with the selected color control, an interactive saturation control associated with the selected color control, and an interactive luminance control associated with the selected color control.

Furthermore, the series of acts 1100 can include, in response to a detected zoom in on a display of the digital image: identifying a plurality of pixels associated with a displayed portion of the digital image; clustering the identified plurality of pixels by color into an updated plurality of clusters of color data points in the second color space; determining the order of dominance associated with the updated plurality of clusters of color data points; and updating the customized editing user interface to include one or more selectable color controls corresponding to the updated plurality of clusters color data points.

In at least one embodiment, the series of acts 1100 can include converting the pixels in the digital image to one or more contour paths based on the plurality of clusters by replacing each pixel in the digital image with a center color from the cluster within which the color data point corresponding to the pixel is grouped.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
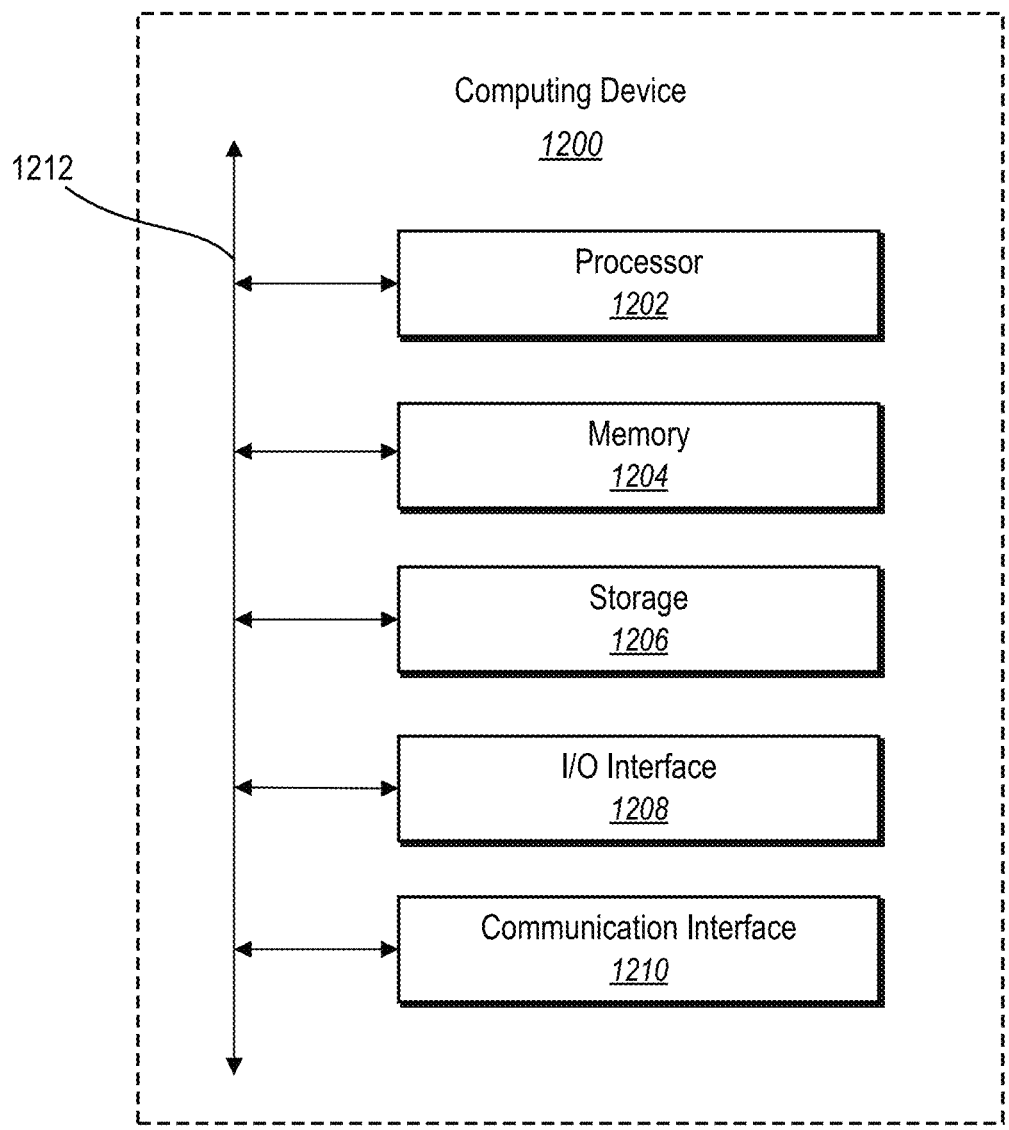
FIG. 12 illustrates a block diagram of an example computing device in accordance with one or more embodiments.

FIG. 12 illustrates a block diagram of an example computing device 1200 that may be configured to perform one or more of the processes described above. One will appreciate that one or more computing devices, such as the computing device 1200 may represent the computing devices described above (e.g., the server(s) 106, and the client computing devices 112). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

We claim:

1. A non-transitory computer-readable storage medium storing instructions thereon that, when executed by at least one processor, cause a computing device to:
   receive a digital image;
   cluster pixels of the digital image by color into a plurality of clusters of color data points;
   determine a plurality of dominant clusters from the plurality of clusters of color data points;
   generate a plurality of selectable color controls that correspond to the plurality of dominant clusters of the plurality of clusters of color data points;
   provide the digital image and the plurality of selectable color controls within an editing user interface;
   detect a selection of a selectable color control of the plurality of selectable color controls; and
   in response to the detected selection of the selectable color control of the plurality of selectable color controls, highlight a portion of the digital image that corresponds to colors associated with the selectable color control by:
      determining a cluster of the plurality of clusters that corresponds to the selected selectable color control;
      determining a contour path that corresponds to the determined cluster; and
      highlighting portions of the digital image within the contour path.

2. The non-transitory computer-readable storage medium as recited in claim 1, further storing instructions thereon that, when executed by the at least one processor, cause the computing device to, prior to clustering pixels of the digital image by color into a plurality of clusters of color data points, convert the pixels from a first color space to a second color space.

3. The non-transitory computer-readable storage medium as recited in claim 2, wherein the first color space is an RGB color space and the second color space is a LAB color space.

4. The non-transitory computer-readable storage medium as recited in claim 2, further storing instructions thereon that, when executed by the at least one processor, cause the computing device to cluster the pixels of the digital image by color into the plurality of clusters of color data points by:
   mapping the pixels as color data points to color data point locations within the second color space; and
   partitioning the color data points within the second color space into clusters so as to minimize a distance between the color data points and at least one cluster center.

5. The non-transitory computer-readable storage medium as recited in claim 1, further storing instructions thereon that, when executed by the at least one processor, cause the computing device to re-cluster one or more of the plurality of clusters of color data points by:
   identifying clusters in the plurality of clusters larger than a threshold size; and
   partitioning the identified clusters into one or more sub-clusters so as to minimize a distance between color data points in the sub-clusters and sub-cluster centers.

6. The non-transitory computer-readable storage medium as recited in claim 1, further storing instructions thereon that, when executed by the at least one processor, cause the computing device to determine an order of dominance associated with the plurality of clusters of color data points by:
  determining a number of color data points associated with each of the plurality of clusters; and
  ordering the plurality of clusters based on the determined numbers of color data points such that a cluster with a highest number of color data points is ordered first.

7. The non-transitory computer-readable storage medium as recited in claim 6, further storing instructions thereon that, when executed by the at least one processor, cause the computing device to:
  arrange plurality of selectable color controls in the editing user interface in the order of dominance.

8. The non-transitory computer-readable storage medium as recited in claim 1, further storing instructions thereon that, when executed by the at least one processor, cause the computing device to:
  detect a first type of user input associated with a selectable color control of the plurality of selectable color controls; and
  in response to the first type of user input, providing a selectable display of one or more selectable secondary color controls wherein each of the one or more selectable secondary color controls is associated with sub-clusters of color data points associated with the cluster of color data points associated with the selectable color control.

9. The non-transitory computer-readable storage medium as recited in claim 1, further storing instructions thereon that, when executed by the at least one processor, cause the computing device to:
  detect a selection of a selectable color control of the plurality of selectable color controls; and
  provide an interactive hue control associated with a color associated with the selectable color control, an interactive saturation control associated with the color associated with the selectable color control, and an interactive luminance control associated with the color associated with the selectable color control.

10. The non-transitory computer-readable storage medium as recited in claim 9, further storing instructions thereon that, when executed by the at least one processor, cause the computing device to, in response to a detected zoom in on a display of the digital image:
  identify a plurality of pixels associated with a displayed portion of the digital image;
  cluster the identified plurality of pixels by color into an updated plurality of clusters of color data points;
  determine an order of dominance associated with the updated plurality of clusters of color data points; and
  update the editing user interface to include one or more additional selectable color controls corresponding to the updated plurality of clusters color data points.

11. A system comprising:
  one or more processors configured to cause the system to:
  receive a digital image;
  cluster pixels of the digital image by color into a plurality of clusters color data points by:
    mapping the pixels as color data points, and
    partitioning the color data points into clusters so as to minimize a distance between the color data points and at least one cluster center;
  generate and provide an editing user interface including a plurality of selectable color controls that correspond to a plurality of dominant clusters of the plurality of clusters of color data points;
  detect a selection of a selectable color control of the plurality of selectable color controls; and
  highlight a portion of the digital image that corresponds to colors associated with the selected selectable color control by:
    determining a cluster of the plurality of clusters that corresponds to the selected selectable color control;
    determining a contour path that corresponds to the determined cluster; and
    highlighting portions of the digital image within the contour path.

12. The system as recited in claim 11, wherein the one or more processors are further configured to cause the system to re-cluster one or more of the plurality of clusters of color data points by:
  identifying clusters in the plurality of clusters larger than a threshold size; and
  partitioning the identified clusters into one or more sub-clusters so as to minimize a distance between color data points in the sub-clusters and sub-cluster centers.

13. The system as recited in claim 12, wherein the one or more processors are further configured to cause the system to determine an order of dominance associated with the plurality of clusters by:
  determining a number of color data points associated with each of the plurality of clusters; and
  ordering the plurality of clusters based on the determined numbers of color data points such that a cluster with the highest number of color data points is ordered first.

14. The system as recited in claim 13, wherein the one or more processors are further configured to cause the system to:
  provide an interactive hue control associated with a color associated with the selectable color control, an interactive saturation control associated with the color associated with the selectable color control, and an interactive luminance control associated with the color associated with the selectable color control.

15. The system as recited in claim 11, wherein the one or more processors are further configured to cause the system to generate one or more contour paths based on the plurality of clusters by associating each pixel in the digital image with a center color from the cluster within which the color data point corresponding to the pixel is grouped.

16. The system as recited in claim 11, wherein the one or more processors are further configured to cause the system to convert the pixels of the digital image from a first color space to a second color space prior to clustering.

17. The system as recited in claim 11, wherein the one or more processors are further configured to cause the system to, in response to a detected zoom in on a display of the digital image:
  identify a plurality of pixels associated with a displayed zoomed portion of the digital image;
  cluster the identified plurality of pixels by color into an updated plurality of clusters of color data points in the second color space;
  determine an order of dominance associated with the updated plurality of clusters of color data points; and
  update the editing user interface to include one or more additional selectable color controls corresponding to the updated plurality of clusters color data points.

18. In a digital medium environment for generating enhanced digital images, a computer-implemented method of creating hue clusters for editing of digital images, in response to a detected zoom in on a display of a digital image comprising:

receiving a digital image;

a step for generating an editing user interface with selectable color controls customized to dominant colors in the digital image;

providing the editing user interface on a client computing device such that a detected selection of one of the selectable color controls in the editing user interface enables corresponding pixels in the digital image to be edited;

identifying a plurality of pixels associated with a displayed zoomed portion of the digital image;

clustering the identified plurality of pixels by color into an updated plurality of clusters of color data points in a second color space;

determining an order of dominance associated with the updated plurality of clusters of color data points; and updating the editing user interface on a client computing device to include one or more additional selectable color controls corresponding to the updated plurality of clusters color data points.

19. The method as recited in claim 18, further comprising:

detecting a selection of a selectable color control of the plurality of selectable color controls;

highlighting, in the digital image, one or more contour paths corresponding to the selected selectable color control; and providing, in the editing user interface, an interactive hue control, an interactive saturation control, and an interactive luminance control.

20. The method as recited in claim 19, further comprising:

detecting interactions with at least one of the interactive hue control, the interactive saturation control, or the interactive luminance control; and altering, in accordance with the detected interactions, characteristics of pixels in the digital image that correspond to the cluster represented by the selectable color control.

* * * * *